(12) United States Patent
Burke et al.

(10) Patent No.: US 8,742,916 B2
(45) Date of Patent: Jun. 3, 2014

(54) WARNING LIGHT ARRANGEMENTS; COMPONENTS; AND, METHODS

(75) Inventors: Bernard Burke, Joliet, IL (US); Vincent Fleszewski, Crown Point, IN (US); Charles Meyer, New Lenox, IL (US); Christopher Radzik, Orland Park, IL (US); George Frank, Crown Point, IN (US); Sigmund Urbanski, Orland Park, IL (US); Paul Gergets, St. John, IN (US)

(73) Assignee: Federal Signal Corporation, Oak Brook, IL (US)

( * ) Notice: Subject to any disclaimer, the term of this patent is extended or adjusted under 35 U.S.C. 154(b) by 519 days.

(21) Appl. No.: 12/776,500

(22) Filed: May 10, 2010

(65) Prior Publication Data
US 2010/0321177 A1    Dec. 23, 2010

Related U.S. Application Data

(60) Provisional application No. 61/178,348, filed on May 14, 2009, provisional application No. 61/178,354, filed on May 14, 2009, provisional application No. 61/306,240, filed on Feb. 19, 2010.

(51) Int. Cl.
*B60Q 1/26* (2006.01)
*B60Q 7/00* (2006.01)
*G08B 5/22* (2006.01)

(52) U.S. Cl.
USPC ........... 340/468; 340/471; 340/472; 340/473; 340/815.45; 362/493; 362/800

(58) Field of Classification Search
USPC ............ 340/468, 471, 472, 473, 332, 815.45
See application file for complete search history.

(56) References Cited

U.S. PATENT DOCUMENTS

| | | | |
|---|---|---|---|
| D324,921 S | 3/1992 | Stanuch | |
| 5,097,397 A * | 3/1992 | Stanuch et al. | 362/493 |
| D330,687 S | 11/1992 | Stanuch | |
| 5,400,246 A * | 3/1995 | Wilson et al. | 700/17 |
| D363,675 S * | 10/1995 | Sasaki et al. | D10/114.4 |
| RE36,245 E | 7/1999 | Stanuch | |
| 5,959,529 A * | 9/1999 | Kail, IV | 340/539.12 |
| 6,100,791 A * | 8/2000 | Bader et al. | 340/331 |
| 7,153,015 B2 | 12/2006 | Brukilacchio | |
| 7,261,447 B2 * | 8/2007 | Menke et al. | 362/503 |
| 7,300,175 B2 | 11/2007 | Brukilacchio | |
| 7,621,662 B1 * | 11/2009 | Colbert | 362/493 |
| 8,147,108 B2 * | 4/2012 | Stein et al. | 362/544 |
| 2003/0021121 A1 * | 1/2003 | Pederson | 362/493 |
| 2007/0242472 A1 * | 10/2007 | Gergets et al. | 362/493 |
| 2008/0049439 A1 * | 2/2008 | Wang | 362/542 |
| 2009/0116257 A1 * | 5/2009 | Rosemeyer et al. | 362/493 |

OTHER PUBLICATIONS

Code3, Defender™, 3 pages, published prior to May 10, 2010.
Code3, RX 2700™ CC, 1 page, published prior to May 10, 2010.
Tomar, 970L Scorpion Low Profile Lightbar, 2 pages, published prior to May 10, 2010.

(Continued)

*Primary Examiner* — Daryl Pope
(74) *Attorney, Agent, or Firm* — Merchant & Gould P.C.

(57) ABSTRACT

The present disclosure provides an LED light bar that provides off axis lighting. The warning light system includes lights that do not need reflectors that rotate to provide good light effects.

25 Claims, 16 Drawing Sheets

(56) References Cited

OTHER PUBLICATIONS

Tomar, THE BLADE™ Low-Profile Lightbar, 4 pages, published prior to May 10, 2010.

Whelan Engineering Co., Inc., Mini Justice® Super-LED® Mini Lightbar Series, © 2008, 1 page.
Whelan Engineering Co., Inc., Whelan® LFL Liberty™ Linear-LED® Lightbars, © 2009, 4 pages.
Defender™, installation manual, 2009.

* cited by examiner

WARNING LIGHT ARRANGEMENTS; COMPONENTS; AND, METHODS

The present application includes the disclosures of U.S. 61/178,348; 61/178,354; and, 61/306,240. A claim of priority is made to each of U.S. Ser. Nos. 61/178,348, filed May 14, 2009; 61/178,354, filed May 14, 2009; and, U.S. Ser. No. 61/306,240, filed Feb. 19, 2010, to the extent appropriate. Also, each of U.S. Ser. Nos. 61/178,348; 61/178,354; and, 61/306,240, is incorporated herein by reference, in its entirety.

FIELD OF THE DISCLOSURE

The present disclosure relates to warning light systems for emergency vehicles and to related methods.

BACKGROUND

Warning light arrangements or systems are typically mounted on the roof of an emergency vehicle (e.g., police car). In some applications, the warning light systems are made up of a number of lights mounted in a straight row on a bar. This configuration does not provide as high a level of off axis lighting as would be desirable. In other words, in systems where the lights are arranged in a straight row across the roof of a vehicle, most of the light is directed either to the front or to the back of the vehicle as opposed to off to the sides of the vehicle.

Warning light arrangements have been were developed in which rotating halogen warning lights are distributed in a V-shape arrangement over the roof of the vehicle, thereby improving the off axis performance of the warning light system. An example is described in U.S. Pat. No. 5,097,397 (later reissued as RE 36,245).

More recently, light emitting diodes (LED's) have been used as light sources in various light systems. LED's are preferred over the halogen lights, in some lighting arrangements, as they consume less power and last longer. Improved LED based warning light arrangements systems are desirable.

SUMMARY

According to the present disclosure, warning light arrangements, components therefor, and related methods and techniques are described. In general, these are applied in the context of warning light arrangements for use on a motor vehicle, for example a police or safety vehicle. The warning light arrangements described are configured to use LED (light emitting diode) light sources. In general, arrangements as described herein provide for good visibility of the warning light arrangement on a safety vehicle, from a variety of perspectives 360° around the police or safety vehicle. In addition, auxiliary light arrangements such as a takedown lights and/or alley lights can be accommodated, with the unit.

It is noted that high visibility for a 360° radius of light effect is provided in preferred arrangements according to the present disclosure, without the use of any arrangements for moving the direction of the light emitting from various LED sources, such as for example through rotating light or rotating reflector arrangements. That is, a typical, preferred arrangement according to the present application involves non-moveable or non-moving reflector LED light sources.

Herein, a variety of preferred techniques, features and structural detail are described. There is no specific requirement that an assembly arrangement, component, or technique involve all of the detail described herein, in order to obtain some benefit according to the present disclosure.

It is noted that the present application includes the disclosures, with edits, of U.S. provisional applications: 61/178,354, filed May 14, 2009; and, U.S. Ser. No. 61/178,348, filed May 14, 2009. The complete disclosures of U.S. Ser. Nos. 61/178,354 and 61/178,348 are incorporated herein, by reference.

BRIEF DESCRIPTION OF THE FIGURES

in FIG. 13 no specific effort being made to indicate precise relative scale between the assembly and the vehicle.

DETAILED DESCRIPTION

Figure 1:
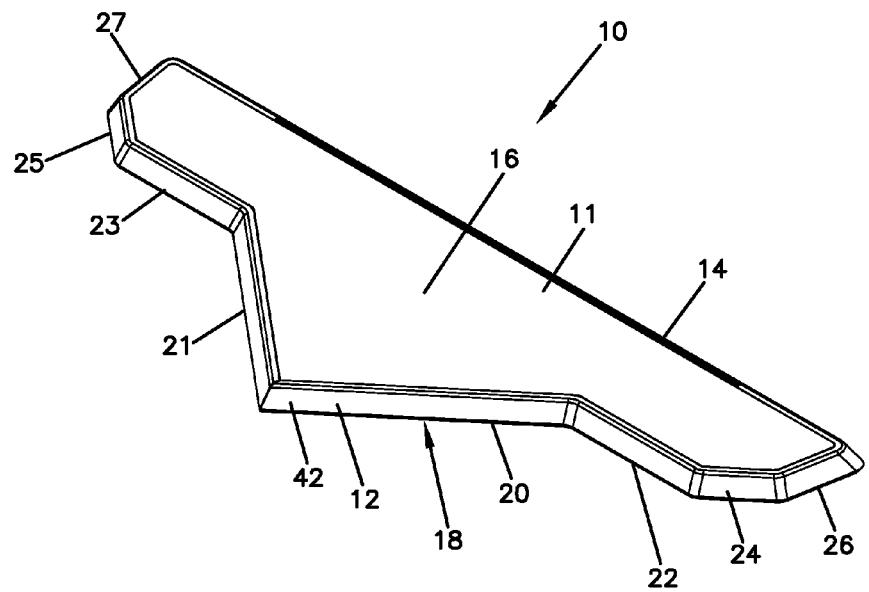
FIG. 1 is a schematic, top, perspective view of a warning light arrangement according to principles of the present disclosure.

I. Additional Background; Example Unit from U.S. Ser. Nos. 61/178,354 and 61/178,348

The present disclosure provides, among other things, principles usable to provide a low profile LED based warning light. The warning light of the present disclosure is also configured to provide off axis lighting to warn people located off to the side of the vehicle. The warning light has optional integrated lights that can shine forward (e.g. take down lights) and off to the side (e.g. alley lights). The integrated lights in the depicted embodiment do not need to rotate to shine in the above described directions. The warning light of a depicted embodiment includes a triangular center front portion with opposed generally bar-shaped end members. The triangular portion provides forward, off axis, lighting and the bar-shaped end members include portions that provide light generally in the forward direction as well as portions generally in a direction laterally to (in some instances nearly perpendicular to) the forward direction.

Referring to FIGS. 1-6, an embodiment of a warning light is shown. The warning light 10 (of U.S. Ser. Nos. 61/178,354 and 61/178,348) includes a housing 11 that includes a leading face 12, a trailing face 14, a top surface 16, and a bottom surface 18. LED light units are arranged inside the housing 11 along: the leading face 12 and, the trailing face 14, which results in the periphery of the body being substantially lined with lights (see FIG. 6).

Herein, the directional terms "leading face", "trailing face", "top surface", and "bottom surface" as used in the previous paragraphs and below, are generally meant to refer to a configuration of the warning light 10 as it would normally be positioned on a vehicle roof for use. Such a normal orientation is depicted in FIG. 1, in top, front, perspective view. Thus, trailing face 14 generally extends rearwardly of the vehicle in use, top surface 16 upwardly, bottom surface 18 downwardly, and leading face 12 forwardly.

In the depicted embodiment, the trailing face 14 is generally straight and has a length $L_1$ that is configured to extend along a width direction of the vehicle, in use. Warning light 10 also includes (defines) center line CC, FIG. 2, that is configured to be aligned with a center line of the vehicle; with the leading face 12 facing the front of the vehicle and the trailing face 14 facing the rear of the vehicle.

In more general terms, center line CC is an alignment axis for the assembly 10, which is intended to be aligned with a central forward/rearward direction axis of a vehicle, when assembly 10 is mounted for use. There is no specific requirement that the axis CC be perfectly aligned with such an axis on a vehicle. However, when assembly 10 is mounted for use, an effort will be made to align the axis CC with a vehicle forward/rear axis to the extent reasonably possible. This will leave: edge 14 directed to the rear of the vehicle, relative to the ordinary passenger position; and, forward region 12 directly forwardly of the vehicle.

In the depicted embodiment, the leading face 12 is generally symmetric about center line CC and includes the following sections: a pair of center off axis portions 20, 21; a pair of take down (front illumination) portions 22, 23; a pair of secondary off axis portions 24, 25; and a pair of alley (side) illumination portions 26, 27. The length $L_2$ of the leading face 12 (total length along face 12 from corner 12a to corner 12b, i.e. not counting alley sections 26 and 27) is a combination of the lengths of certain ones (20, 21, 22, 23, 24, 25) of the above identified sections and is substantially greater than the length $L_1$ of the trailing face 14. In the depicted embodiment, the length $L_2$ is about 53 inches (135 cm) (61 inches or 155 cm with alley sections 26, 27) and the length $L_1$ is about 43 inches or 109 cm. (Thus, in the example $L_2$ is 23 percent greater than $L_1$, although alternatives are possible). In the depicted embodiment the length of the center off axis portions 20, 21 is about 17 inches (43 cm); the length of each of the take down portions 22, 23 is about 4 inches (10 cm); the length of each of the secondary off axis portions 24, 25 is about 4.4 inches (11.2 cm); and, the length of each of the alley illumination portions 26, 27 is about 4.7 inches (12 cm). In the depicted embodiment, the depth D of the warning light system is substantially less than the length $L_1$. For example, the depth D in the depicted embodiment is 20.1 inches (51 cm). Herein, dimension D, FIG. 2, is meant to refer to a maximum length, in a direction of axis CC, of the unit 10.

Figure 2:
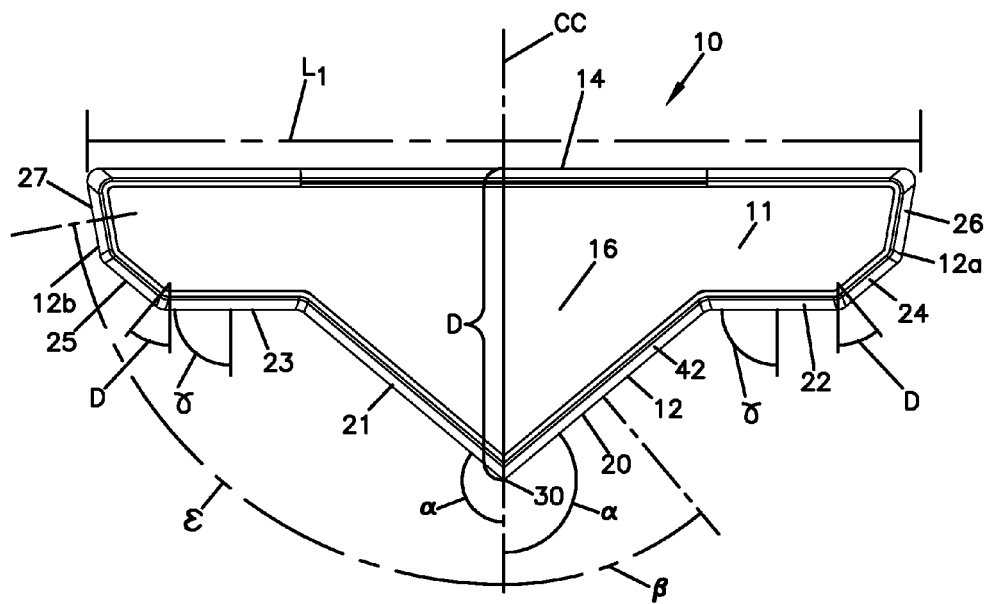
FIG. 2 is a schematic top plan view of the warning light arrangement of FIG. 1.

Still referring to FIG. 2, a top plan view, in the depicted embodiment the pair of center off axis portions 20, 21 form a V-shape with an apex 30 (or nose) at the center front of the warning light 10. The light from these portions (20, 21) is typically emitted (i.e. directed) in a direction perpendicular to the angle of the corresponding section (20, 21). Herein, when reference is made to a direction of light emission or direction, reference is meant to a center. It is recognized that light from a given source will spread over an angle.

In the depicted embodiment, the center off axis portions 20, 21 extend at an obtuse angle $+/-\alpha$ from the center line CC (e.g., between 120°-150°, inclusive). In other words, the direction of the light emitted from the center off axis portions 20, 21 is forwardly at acute angle $+/-\beta$ (30°-60°, inclusive) relative to axis CC. The center off axis portions 20, 21 thus provide off axis light (some light in the forward direction and some light in the side direction) that is particularly helpful in warning people located either forwardly of, or off to the sides, of the vehicle. However, light from units 20, 21 can also be seen from directly in front of the vehicle. Typically, angle B is 35°-55°, inclusive, for example about 45° as shown.

In the depicted embodiment, FIG. 2, the pair of take down (forward) portions 22, 23 is adjacent to the center off axis portions 20, 21. The light from the take down (forward) portions 22, 23 is emitted in a direction generally perpendicular to the angle of the sections 22, 23. In the depicted embodiment the take down sections 22, 23 are at an angle of $+/-\gamma$ from the center line CC (e.g., about 80°-110°, inclusive) In other words the direction of the light emitted from the take down portions 22 is at an angle typically within the range of 0°-10°, inclusive, relative to the axis CC. The take down portions 22, 23 provide on axis light that is particularly helpful to shine light forward. This is useful, for example, when a police officer pulls over a vehicle and desires to shine light on the other vehicle while parked behind that vehicle.

In the depicted embodiment, FIG. 2, a pair of secondary off axis portions 24, 25 are located adjacent the take down portions 22, 23. These portions can be at the same or different angle as the center off axis portions 20, 21. In the depicted embodiment, the secondary off axis portions 24, 25 are at the same angle relative to the center line CC as the center off axis portions 20, 21. The secondary off axis portions 26, 27 provide additional forward, off axis, light, at angle D.

In the depicted embodiment, the alley illumination portions 26, 27 are located adjacent the secondary off axis portions 24, 25. The lights from these portions are emitted in a direction generally perpendicular to the angle of the sections 24, 25. In the depicted embodiment the alley illumination portions 26, 27 are at $+/-\epsilon$ from the center line CC (e.g., between 160°-190°, inclusive). In other words the direction of the light emitted from the alley illumination portions 26, 27 is at an angle of 70°-100°, inclusive relative to axis CC. The alley illumination portions 26, 27 are particularly useful in shining lights in a direction generally perpendicular to the vehicle (e.g., down a side alley or at buildings as the vehicle is positioned on a street).

Figure 3:
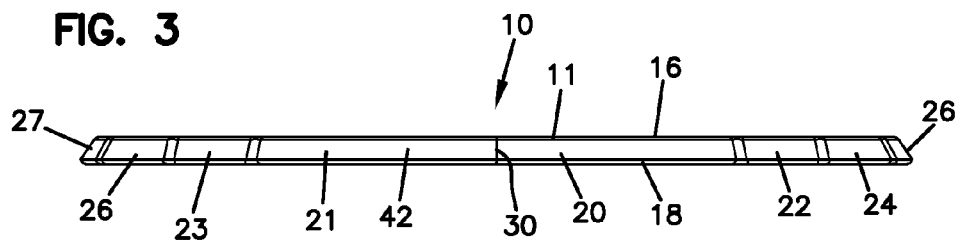
FIG. 3 is a schematic front elevational view of the warning light arrangement of FIG. 1.

In FIG. 3, a front elevational view of assembly 10 is provided, taken generally toward apex 30 of housing 11. In FIG.

Figure 4:
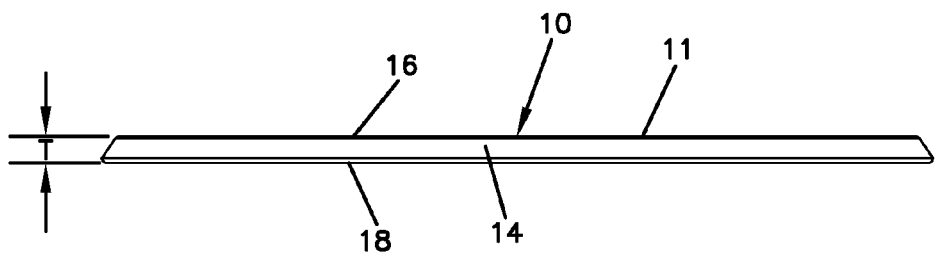
FIG. 4 is a schematic rear elevational view of the warning light arrangement of FIG. 1.

4, a rear elevational view is depicted; i.e. the view of FIG. 4 being generally toward rear 14 of housing 10.

Figure 5:
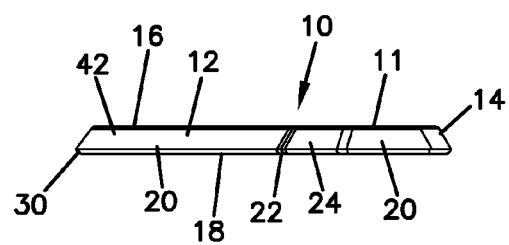
FIG. 5 is a schematic, first, side view of the warning light arrangement of FIG. 1.

In FIG. 5, a first side elevational view is depicted. The view be generally toward side section 20, FIG. 2. An opposite side view would be generally a mirror image.

Figure 6:
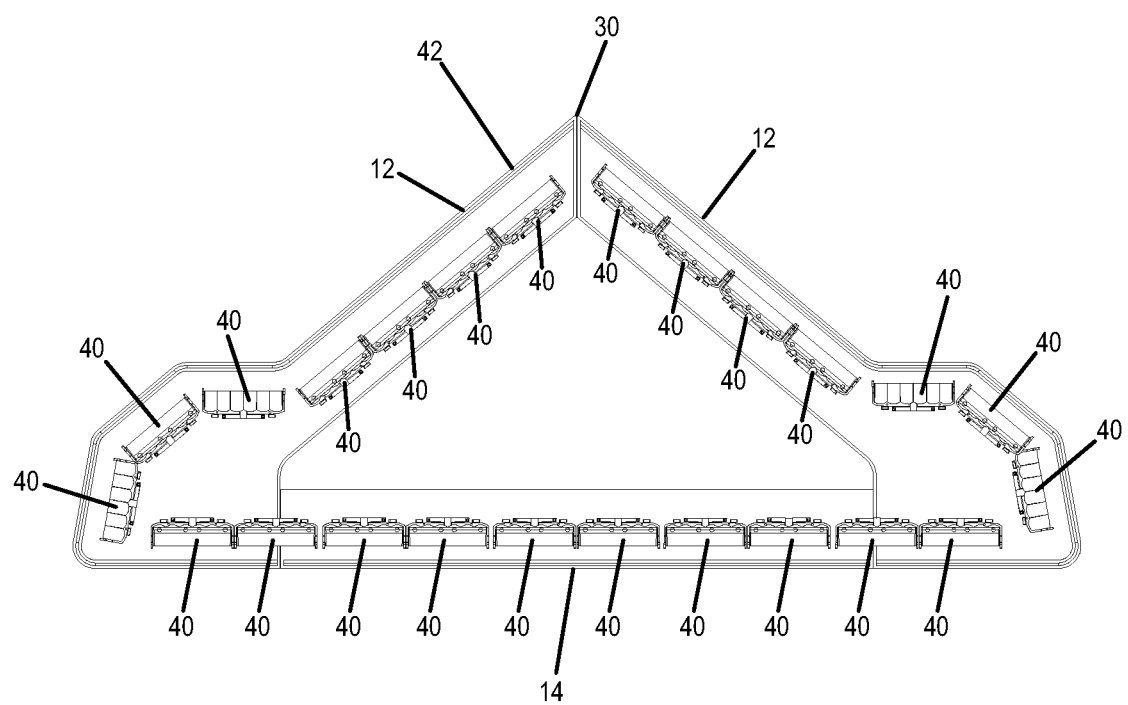
FIG. 6 is a schematic view of a portion the warning light arrangement of FIG. 1, depicting example LED unit positions.

In FIG. 6, a top plan view is depicted of a component of the assembly 10, showing inside of housing 11, where individual LED units 40, for generating light, can be positioned.

Referring to FIG. 6, in the depicted embodiment, the LED light units 40 that are positioned along the leading face 12 and the trailing face 14 are LED units that do not rotate. In the depicted embodiment lenses 42 are positioned adjacent the leading edge 12 and direct light from the LED light units in a direction that corresponds to the orientation of the leading edge 12. This configuration results in a simple and robust system in which the lights need not rotate. Also, this configuration allows for systems that are generally of lower profile than systems with rotating lights. For example, in the depicted embodiment the thickness T, FIG. 4, of the housing 11 (body) of the warning light 10 is less than 3 inches or 7.6 cm (e.g., about 2.25 inches or 5.7 cm). However, it should be appreciated that one or more rotating lights could also be used in the depicted configuration.

In the depicted embodiment the described sections are straight, but it should be appreciated that selected sections could be curved. In the depicted embodiment the profile of the sections correspond with the orientation of the lights in the section, but it should be appreciated that the orientation of the lights can be different from the orientation of the sections. For example, the sections can have a curved profile while the lights are arranged in a straight line in that section. Also, a possible variation is lights arranged in a curved orientation while the face section is straight.

II. An Example Assembly, Components, and Environment of Use; FIGS. 7-21

In FIGS. 7-21, the general principles outlined above, with respect to FIGS. 1 and 6, are depicted, in a typical example environment for use.

Figure 7:
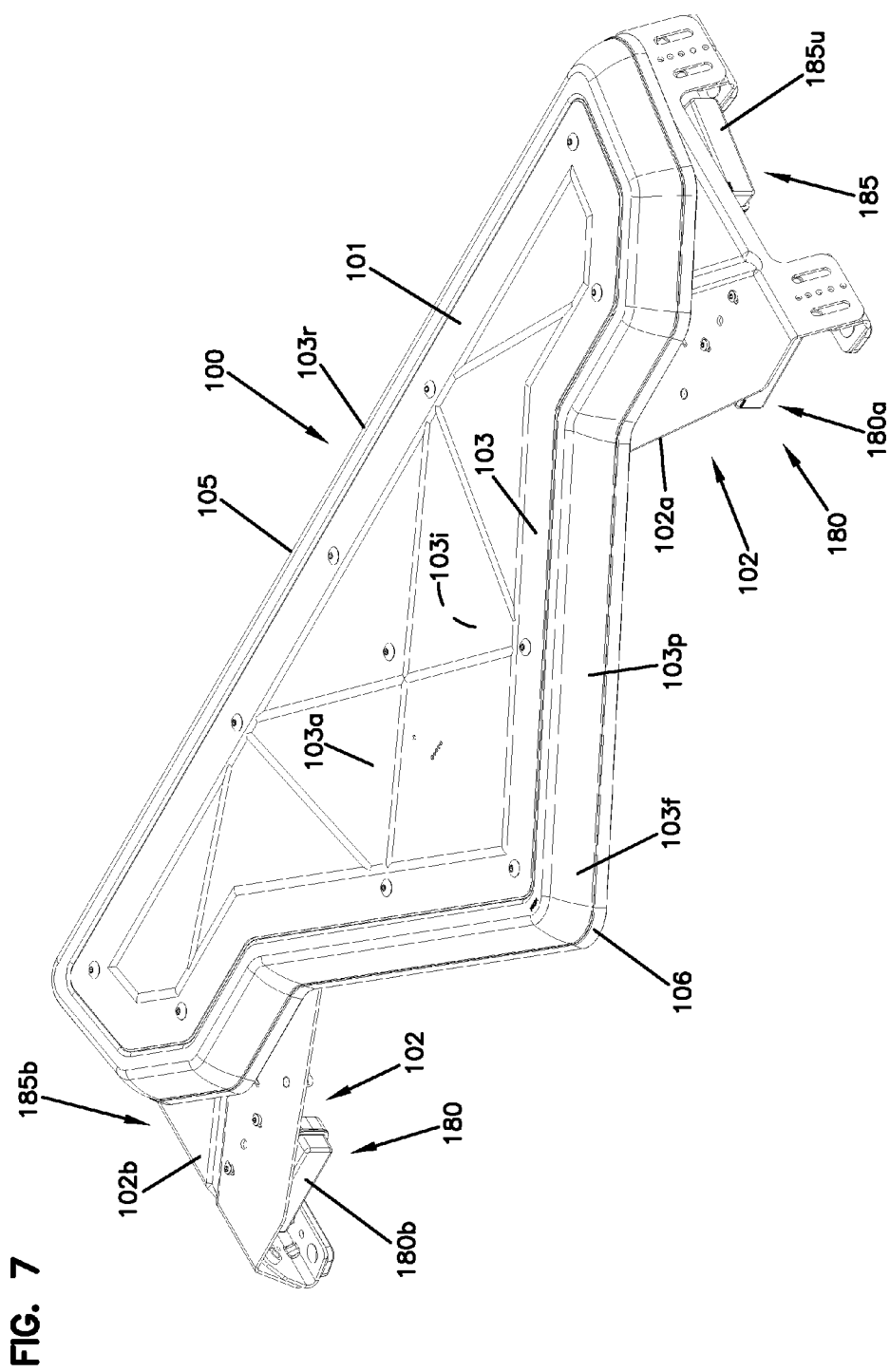
FIG. 7 is a schematic top perspective view of an assembly including: a warning light arrangement, incorporating principles of the present disclosure, depicted mounted on a frame for attachment to a vehicle.

Referring first to FIG. 7, a warning light arrangement in accord with the principles of the present disclosure is depicted at 100. The warning light arrangement 100 comprises a light assembly 101 secured to a mounting arrangement 102. The mounting arrangement 102 comprises brackets 102a, 102b configured to provide for securement of the light assembly 101 to a vehicle, for use. An example would be securement to the roof of a police vehicle, as discussed below in connection with FIG. 13.

Figure 8:
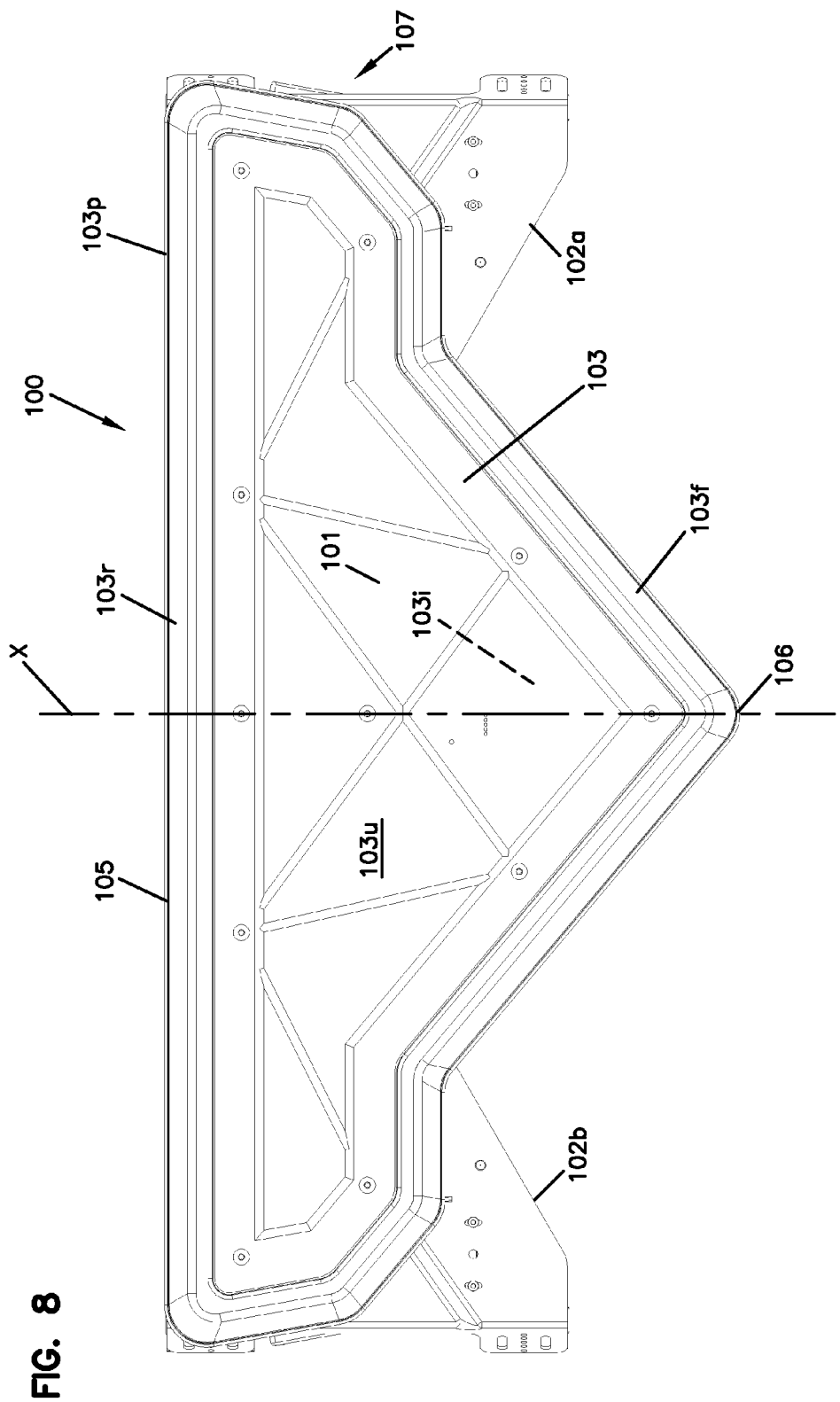
FIG. 8 is a schematic top plan view of the assembly depicted in FIG. 7.

In FIG. 8, a top plan view of the assembly 100 is depicted. In FIG. 8, attention is directed to axis X. Herein, axis X is referred to as the "vehicle direction central alignment axis" of the warning light arrangement in the light assembly 101. The term "vehicle direction central alignment axis", and variants thereof, is meant to refer to an axis of the arrangement 100 (and assembly 101) which would be normally oriented in alignment with a direction of movement of a vehicle on which the arrangement 100 is used. It is noted that there is no specific requirement that the arrangement 100 be mounted on a vehicle such that the vehicle forward direction alignment axis X of the arrangement 100 is perfectly aligned with the actual direction of forward movement of the vehicle, when the vehicle is moved directly forwardly. However, in general, best operation of the arrangement 100 will be when there is such an alignment or nearly such an alignment. Here, axis X corresponds generally to axis CC, FIG. 2, discussed above.

In general terms, light assembly 101, and thus the warning light arrangement 100, includes a housing 103. The housing 103 defines a perimeter 103p and a housing interior 103i. The housing 103 is sized and configured to be operably positioned on the roof of a vehicle, in use. The housing perimeter 103p is configured to define a forwardly directed, front, portion 103f and an opposite, rearwardly directed, rear portion 103r. The housing 103 can be characterized as defining the vehicle direction central alignment axis X.

In general terms, perimeter 103p provides optic sections, through which light is projected as described in greater detail below.

Referring to FIGS. 7 and 8, the light assembly 101 (and housing 103) includes a rear edge 105 which, in use, comprises the rearwardly directed perimeter portion 103r oriented directed rearwardly of a vehicle on which the light assembly 101 is mounted. Typically, rear edge 105, and, thus, rearwardly directed rear portion 103r of housing 103, extends straight over a distance of at least 35 inches (89 cm) and typically at least 40 inches (102 cm). Also, typically the edge 105, i.e. rearwardly directed rear portion 103r, extends generally perpendicularly to the axis X. Further, typically rear edge 105, i.e. rearwardly directed rear portion 103r, is bifurcated by the central axis X, and extends away from central axis X in equal amounts in each of two opposite directions.

Figure 9:
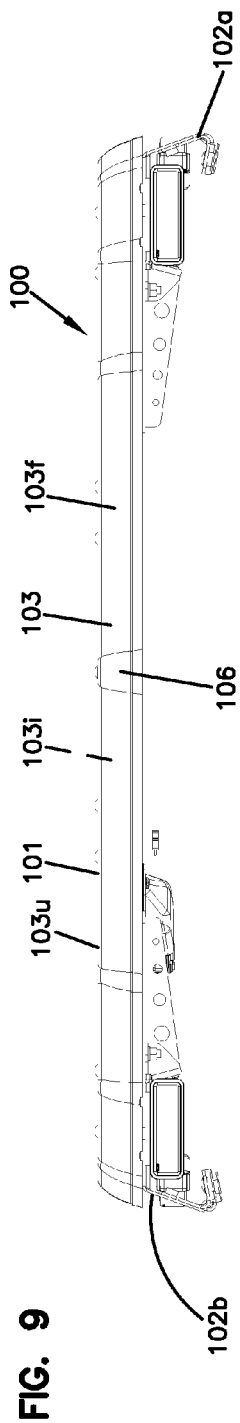
FIG. 9 is a schematic front elevational view of the assembly depicted in FIG. 7.

In FIG. 9, a front plan view of the assembly 102 is depicted, the view being generally oriented toward front point or nose 106, FIG. 8.

Figure 10:
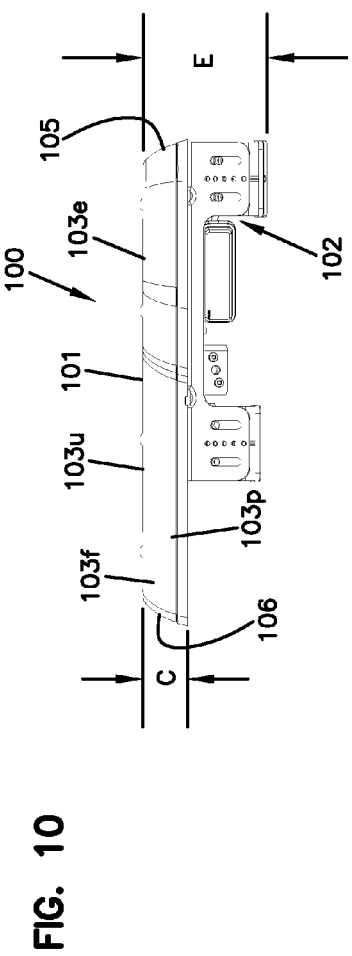
FIG. 10 is a schematic first side elevational view of the assembly of depicted in FIGS. 7-9.

In FIG. 10, a first side elevational view of the assembly 100 is depicted. The view of FIG. 10 is generally in the direction of arrow 107, FIG. 8. It is noted that an opposite view, at least with respect to the configuration of the housing 103, would generally be a mirror image.

Still referring to FIG. 10, the assembly 100 is generally configured so that the housing 103 has a maximum vertical dimension, shown at C, of no greater than 4 inches (10.2 cm), typically no greater than 3 inches (7.6 cm); and, usually within the range of 1.5-2.5 inches inclusive (3.8-6.4 cm, inclusive).

Typically the overall warning light assembly 100 is configured so that its total vertical height in projection above the vehicle roof, in use, extends no more than 8 inches (20.3 cm) typically no more than 7 inches (17.8 cm); and, usually an amount within the range of 3-7 inches, inclusive (7.6-17.8 cm). The maximum "total height" is indicated at dimension E, FIG. 10, and comprises the maximum height (C) of the housing 103 plus height added above a vehicle roof by the bracket arrangement 102.

Typically, the housing assembly 100 is configured so that as a percentage of the total maximum height of projection above a vehicle roof in use, indicated generally at dimension E, FIG. 10, the total height contributed by the housing 103, indicated at dimension C, FIG. 10, is no more than 70%, typically no more than 60% and preferably no more than 50%.

Typically the housing 103 is configured with an upper surface 103u, FIGS. 7-9, which is relatively flat, but may include some modification therein. However, typically the housing perimeter 103p defines an upper edge 103e, FIG. 10, which defines a relatively planar upper perimeter, i.e. portions are relief therein of no greater than about 1 inch (2.5 cm) typically no more than 0.5 inch (1.3 cm) and usually no greater than about 0.25 inch (0.64 cm). This will allow the housing 103 to present an upper edge in profile, when viewed from outside of the vehicle, that appears relatively flat, to advantage. This definition preferably, then, applies to each section along the perimeter 103p.

Figure 11:
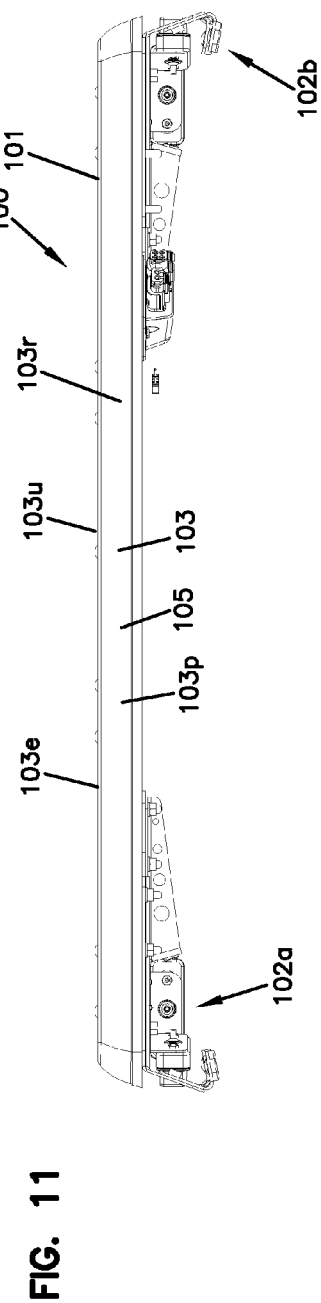
FIG. 11 is a schematic rear elevational view of the assembly depicted in FIGS. 7-10.

In FIG. 11, a rear elevational view of warning light assembly 100 is depicted, taken generally toward rear edge 105.

Figure 12:
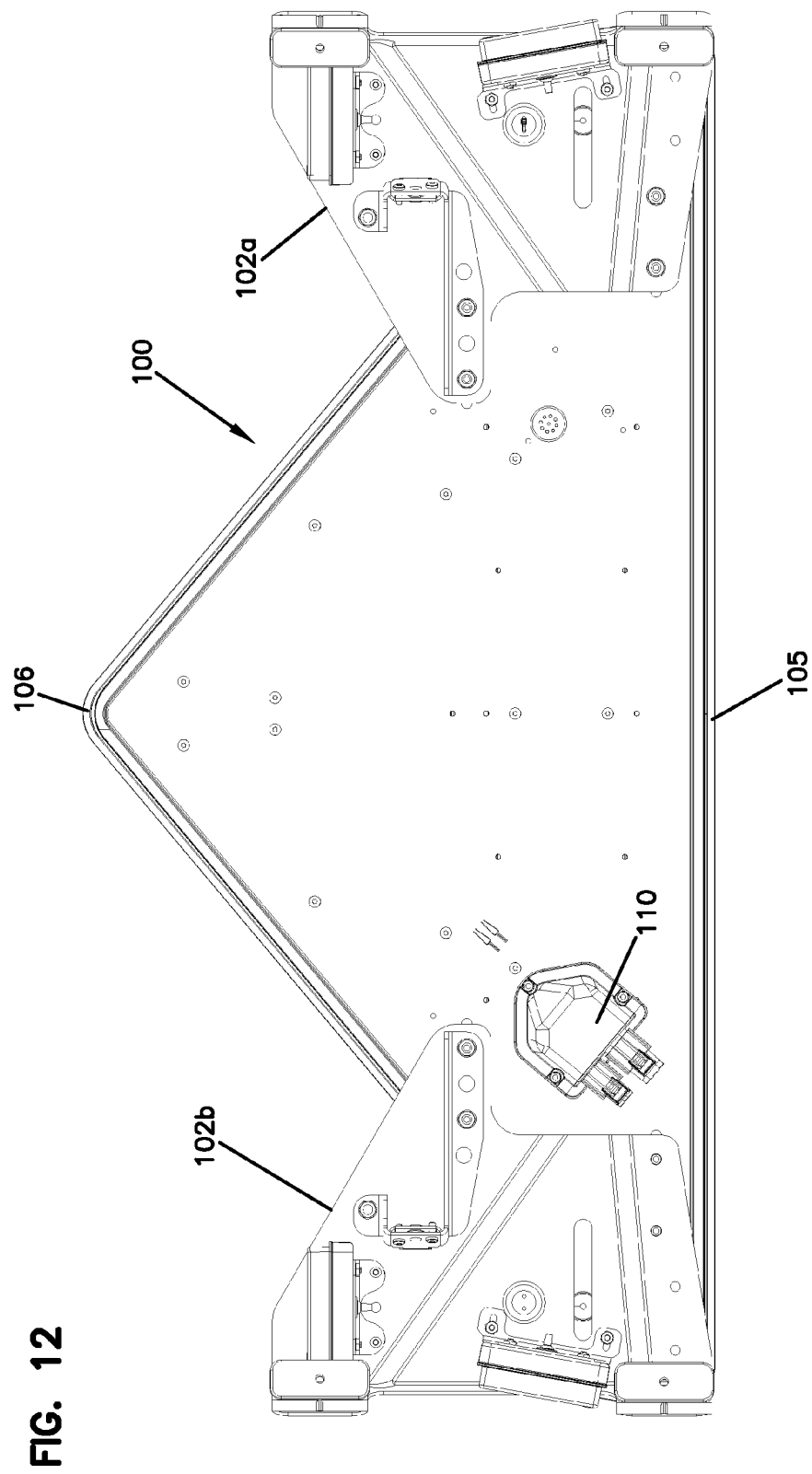
FIG. 12 is a schematic bottom plan view of the assembly depicted in FIGS. 7-12

In FIG. 12, a bottom plan view of the assembly 100 is depicted. Connector 110 is viewable. The connector 110 includes appropriate electrical connectors, for attachment to power and control sources in a vehicle.

Figure 13:
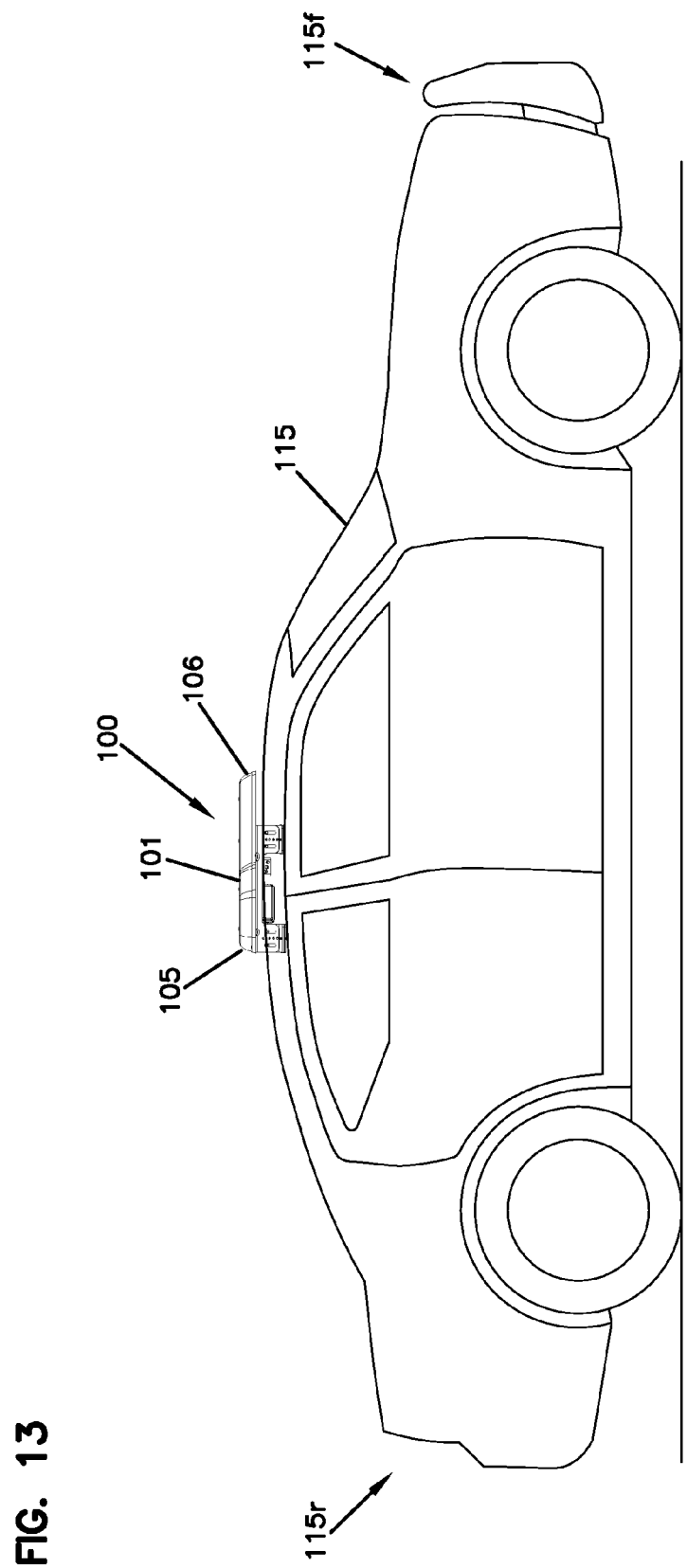
FIG. 13 is a schematic side elevational depiction of the assembly of FIGS. 7-12 depicted on a vehicle for use.

In FIG. 13, a schematic side elevational view is depicted of the assembly 100 mounted on a vehicle 115, for use is provided. There is no specific intent to depict the relative scale between the assembly 100 and the vehicle 115 precisely in the drawing. However, a general understanding of the intent, for use, will be understood from FIG. 13.

Thus, referring to FIG. 13, the vehicle 115 generally has a front 115*f* and rear 115*r*. The assembly 100 is configured with the housing 101 oriented with: the front or nose 106 directed forwardly, i.e. toward the vehicle front 115*f*; and, the housing rear 105 generally directed toward the vehicle rear 115*r*.

In a typical use, the assembly 100 will be positioned, for example, on a police vehicle or safety vehicle. With such vehicles, it is desired for the warning light assembly to selectively provide for at least the following characteristics:
1. Substantial visibility of warning light activity or effect from the rear;
2. Substantial visibility of warning light activity or effect from the front; and,
3. Substantial off axis visibility of warning light activity or effect from each opposite side.

Indeed, it is preferable that the assembly 100 provide for substantially visible light effect from locations 360° around the vehicle. Features that allow for this are provided.

Substantial visibility of warning light activity from the rear edge, is generally provided by appropriate rearwardly facing light units (light emitters) in the warning light arrangement. Typically the rearwardly facing light units or emitters are configured to direct light, a selected portion of the time, in a direction either in alignment with the axis X, or at an acute angle with respect thereto of no more than about 20°, typically no more than about 15°, and usually no greater than 10°, i.e. at an angle to axis X of 0°-20°, inclusive, typically 0°-15°, inclusive, usually 0°-10°, inclusive. As will be understood from specific examples described herein below, in typical arrangements according to the present disclosure, the warning light activity visible from the rear is provided by a plurality of LED units containing light emitting diodes (LED's). Herein, when reference is made to a direction of light emission, projection or direction, reference is meant generally to a center line of light emitting from a source (and its direction). It will be recognized that as the light is projected outwardly from a source, it will diffuse somewhat, and thus extend over an angle. Indeed typically a light unit is described herein will project light over a substantial angle, as discussed below.

Typically, substantially visibility of emitted light activity from the front is provided by warning lights directed generally forwardly of the vehicle, i.e. away from the rear edge 103*r*. However, unlike warning light activity visible from the rear, this warning light activity is provided at least in part by lights that are not directed substantially parallel to the vehicle direction central alignment axis X, but rather are provided by a plurality of lights directed forwardly, at an acute angle to the axis X, within of the range of 20°-70°, inclusive; typically within the range of 30°-60°, inclusive; and usually within the range of 35°-55°, inclusive. Reasons for this will be apparent from the following descriptions. Here, again, the angles reference direction of light projection relative to the axis X Typically, the term "substantial off axis visibility of warning light activity", from each opposite side, is meant to refer to off axis visibility from a location forward of the vehicle off to the driver's left and also forward of the vehicle and off to the drivers' right. This would, for example, be the general view direction of a viewer: in a vehicle moving toward an intersection toward which the vehicle 115 is also moving; or, approaching a stopped police vehicle with the warning light arrangement 100 operating, but from a side direction.

It is also preferred, by some users, that the warning light or light bar arrangement have a relatively low profile. A reason for this is that relatively low profile projecting upwardly from the car, makes spotting the vehicle as a police vehicle, when the warning lights are not on, more difficult for other drivers. That is, when it is desired by the operator of the police vehicle that it be less conspicuous, a lower profile projection upwardly from the top of the car provides for this. Typically, a total maximum profile in projection as described above is sufficient. Also, typically and preferably, an upper surface of the light bar is relatively flat, i.e. does not have areas of relatively high relief (as described) so as to again have the light bar appear similar to luggage rack or carrier, and less clearly like the distinctive light bar set that often identifies a police or similar vehicle.

In addition, a relatively low, smooth profile can provide for preferred aerodynamics, improved gas mileage and a quieter ride.

In general terms, the warning light arrangement 100 is configured to be preferable and usable in a variety of circumstances. Highway patrol agencies, for example, often prefer to have a "stealth" look, for patrol vehicles. This look would be one in which the vehicle cannot be easily identified as a police-type vehicle, until the lights are turned on. A low profile relief look facilitates this. On the other hand, the unit provides for very high visibility, when the lights are turned on. Also, a variety of light effects can be chosen, as now described.

It is often desirable to the vehicle operator to provide an array of possible light operations which include at least the following:
1. A display of moving light visible from the rear;
2. A display of moving light visible from the front;
3. A display of moving light visible from each side;
4. A display of moving light visible from a position forward of the vehicle but not directly in front, for each side; and,
5. A spotter light arrangement usable by the vehicle operator, to direct a light beams forwardly and/or laterally with respect to each side of the vehicle.

In accord with the present disclosure, these and other objectives are met by providing a preferred assembly in accord with the described FIGS. 7-18. Componentry by which this is feasible is now described.

Figure 14:
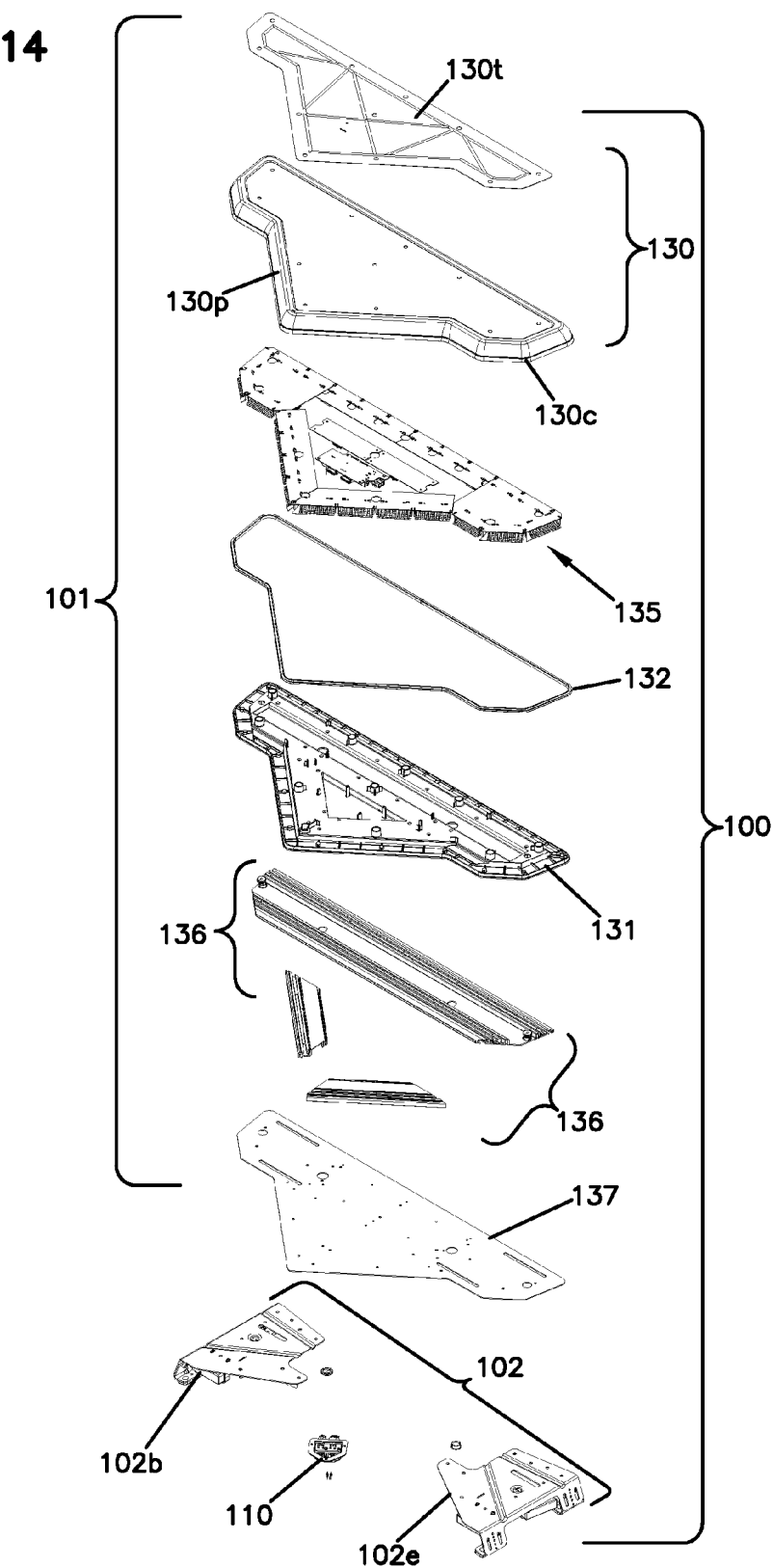
FIG. 14 is a schematic, exploded, perspective view of the assembly of FIGS. 7-12.

Attention is first directed to FIG. 14, an exploded perspective view of the assembly 100 of FIGS. 7-10. Referring to FIG. 14, at 101, the light assembly is depicted exploded; and, at 102, the brackets 102*a*, 102*b* are depicted.

Referring to FIG. 14, selected componentry indicated at 130 will be referred to herein as a cover assembly of the light assembly 101; and, selected componentry 131 will be referred to herein as a base assembly. It is noted that in FIG. 14, fasteners such as bolts or other fasteners are not shown, for convenience.

Referring to FIG. 14, at 130*c*, a plastic cover is provided. The plastic cover 130*c* is generally configured to provide features of perimeter 103*p* as previously discussed. Typically, cover 130*c* is formed of a plastic that can be managed to provide for optic surfaces in perimeter 103*p*. For example, an injection molded polycarbonate can be used.

At 130*t* a top cover piece is shown. The top cover piece 130*t* can be secured to an upper portion of cover 130*c*, to provide aesthetics and to provide for strength and protection. Typically, the top 130t would comprise, for example, a galvanized steel piece. To can be secured in place, for example, by fasteners such as bolts or screws. The top 130t depicted is engraved for aesthetics.

In general, cover 130 and base 131 are secured together by fasteners (not shown) with gasket 132 therebetween, to provide to weather sealing. Internal componentry, i.e. LED units, are shown generally at 135. These would typically be positioned within an interior 103i defined by cover 130c and base 131.

Still referring to FIG. 14, at 136 brackets is depicted, that can be attached to the assembly 101, for structure. At 137, a structural place is shown, providing strength and integrity to the system for mounting of componentry.

At 110, the connector is depicted, providing electrical connection to the equipment within a vehicle.

Figure 15:
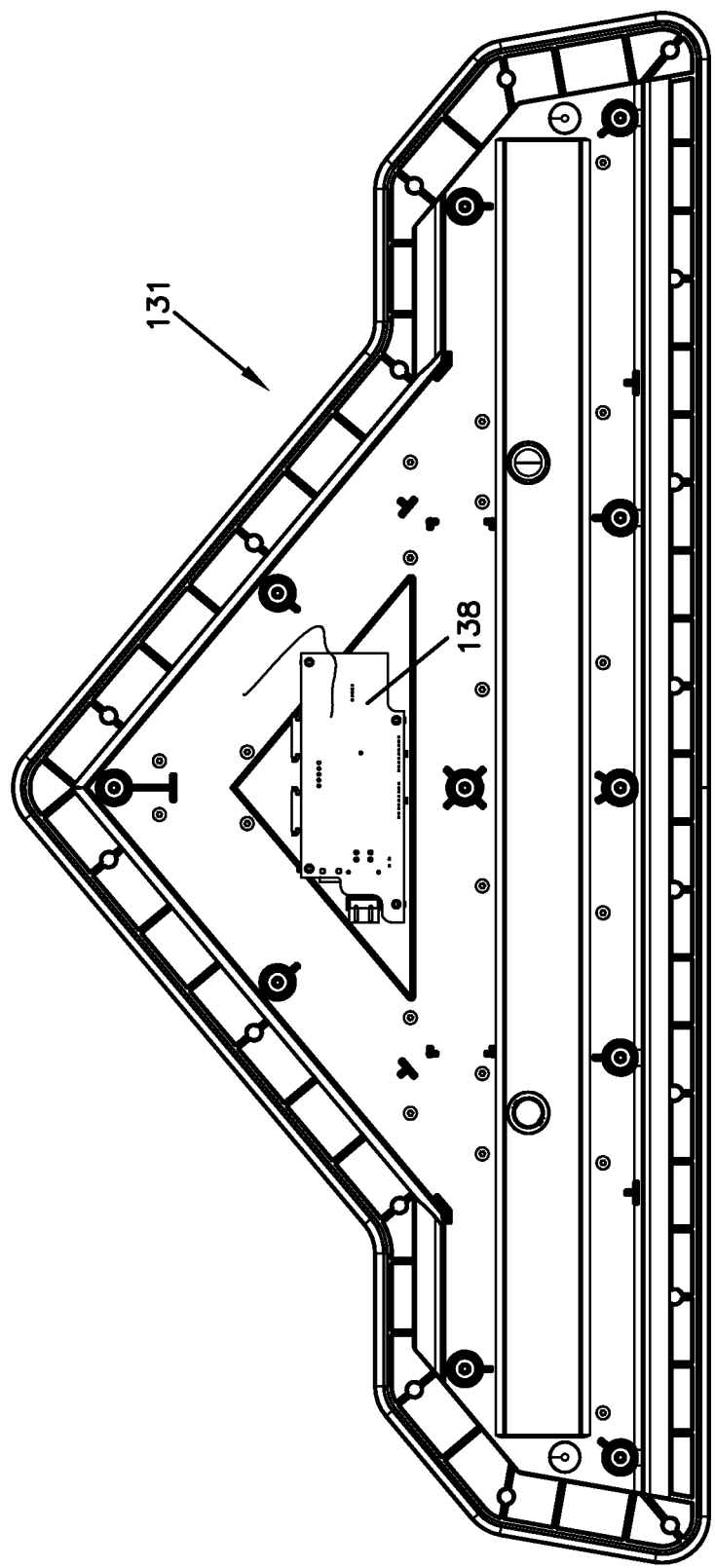
FIG. 15 is a schematic top plan view of a housing bottom portion of the assembly of FIG. 14.

In FIG. 15, an enlarged top plan view of base 131 is viewable. Electrical card 138, for electrical connection of selected LED units, is depicted.

Figure 16:
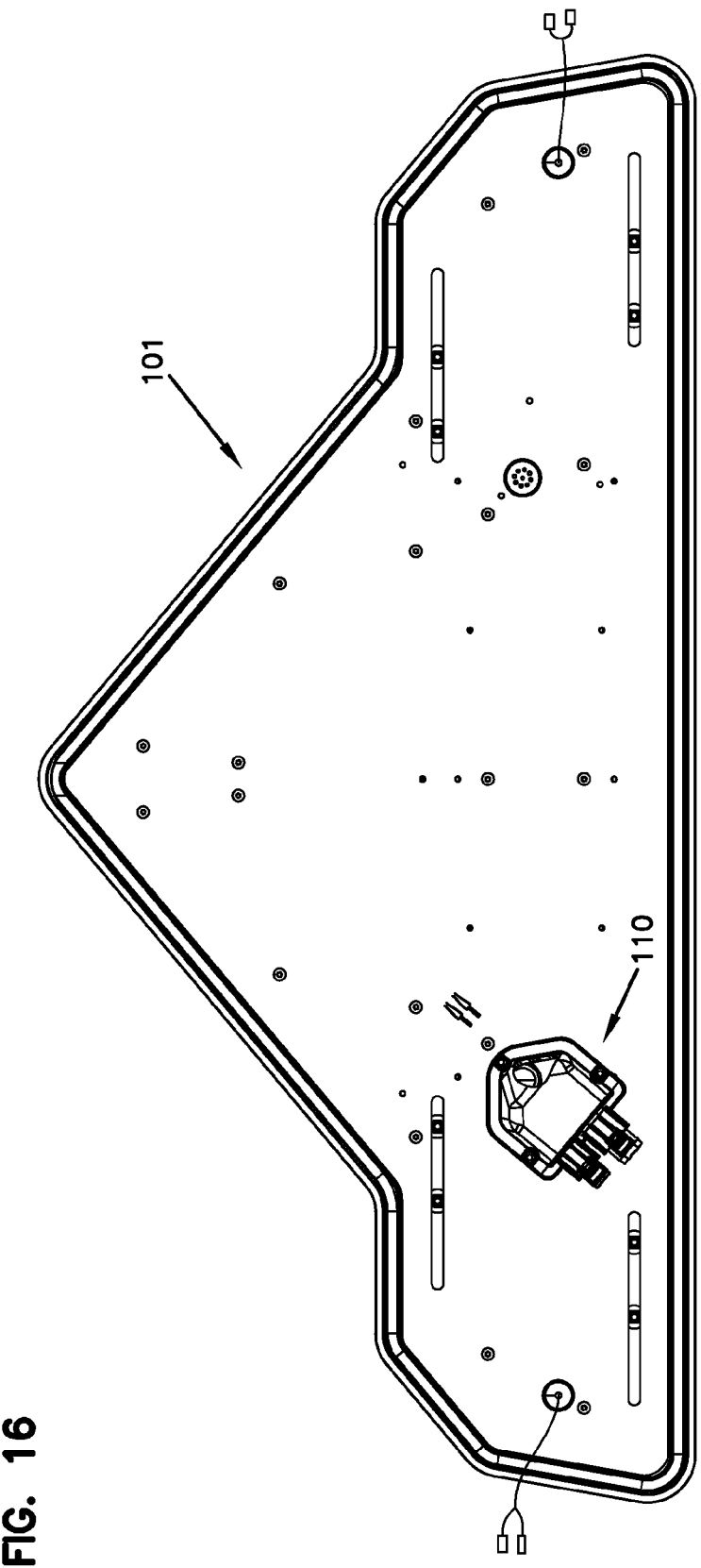
FIG. 16 is a schematic bottom plan view of the portion of assembly depicted in FIG. 15.

In FIG. 16, a bottom plan view of assembly 100 is depicted, without bracket arrangement 102 thereon. Connector 110 can be seen positioned for connection to equipment within a vehicle.

Figure 17:
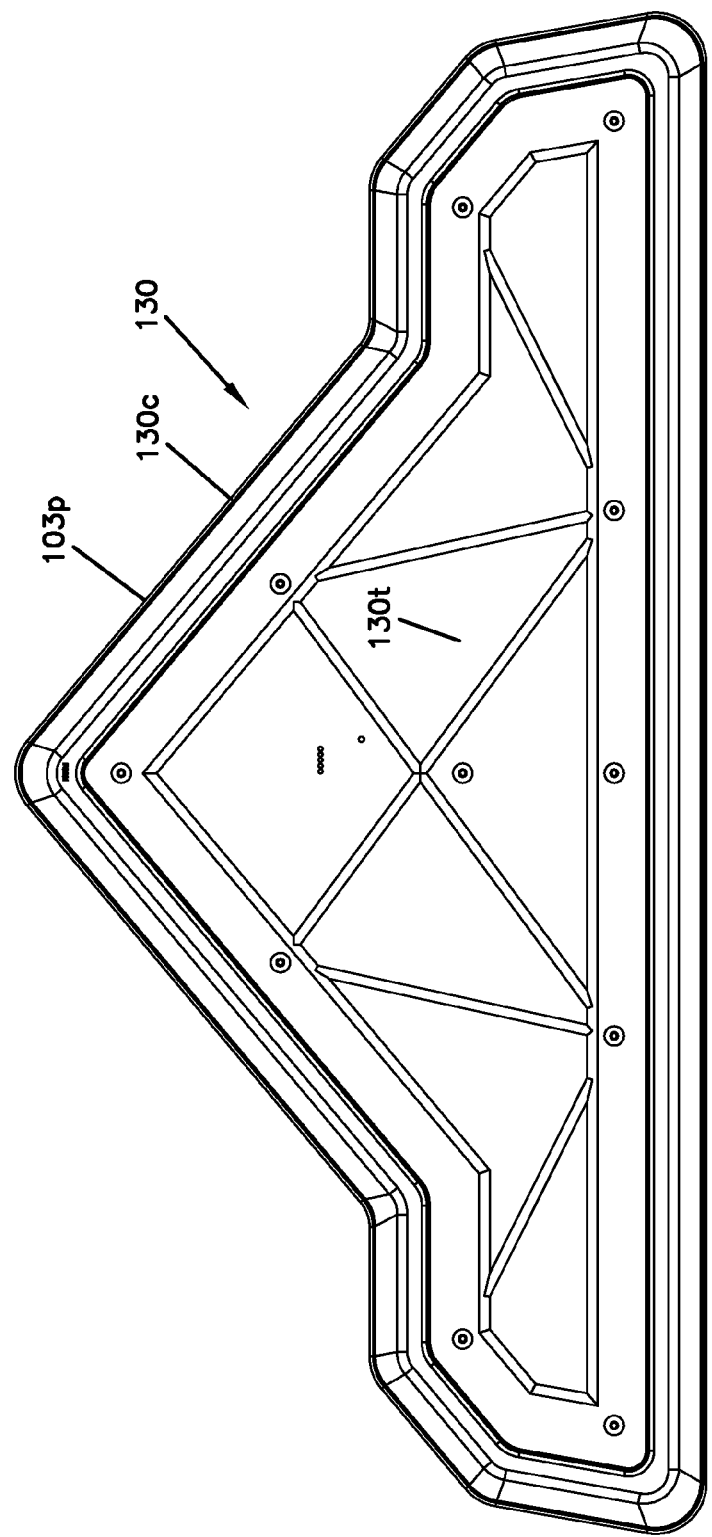
FIG. 17 is a schematic top plan view of a housing cover portion of the assembly of FIG. 14.

In FIG. 17, a top plan view of the cover assembly 130 is depicted. The cover assembly 130 includes, generally, an optic member and light generating members appropriately positioned thereunder to achieve the effects desired.

Figure 18:
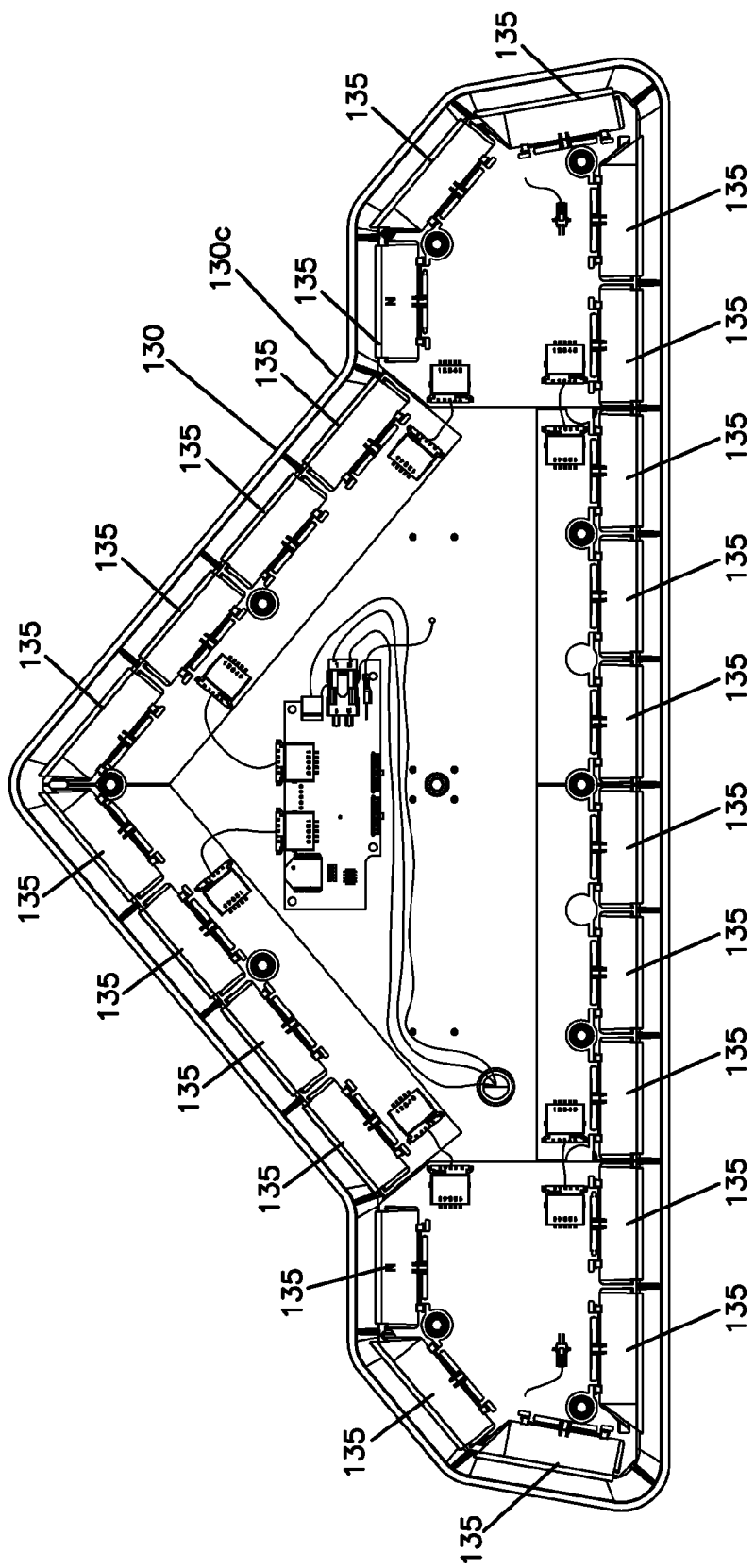
FIG. 18 is a schematic bottom plan view of the housing cover portion of FIG. 17, depicted showing example LED unit positions therein.

In FIG. 18, a bottom plan view of the cover assembly 130 is depicted. At 135, individual light or light-emitting units are identified. In FIG. 18, for the example depicted, units 135 each comprise an LED unit (light emitting diode arrangement) positioned and oriented as it would typically be adjacent the cover 130c. It is noted that, although alternatives are possible, the LED units 135 depicted are each oriented so that light directed therefrom, and outwardly through the cover 130c, is directed in a single direction only and thus any reflector, etc., does not rotate selectively or move in use. Thus, the LED units 135 are non-moveable or not moveable reflector arrangements. The term "non-moveable" in this context, is meant to indicate light effects provided by the LED units individually are not moving light effects but rather direct light therefrom in a selected direction. The term "selected direction" is meant to refer to a direction of light cast or projection (for example reflected) from the unit, in the center thereof, and is not meant to suggest the light does not diffuse as it projects.

Moving light effects, then, are generated by switching on and off (or changing brightness of) selected ones of the LED units 135.

The particular assembly 101 depicted, includes 24 light units (LED units) 135 in an array within an interior 103i of housing 103. Alternatives are possible. It is noted that there is no specific requirement that the individual light units 135 all be the same. The schematic of FIG. 18 is configured to show general orientation of the individual light units (LED units) 135. The light units 135 can each include more than one LED chip therein.

Typically, each of the LED units includes a plurality of LED chips or members for each selected color. For example, if an LED unit is chosen to provide, at any given time, one of three selected colors, it might include six LED chips of each color, eighteen (18) LED chips total. Typically, colors will be chosen from among red, blue, amber and white.

It is noted that for those lights intended to provide a broad moving light effects, such as lights both forwardly and off-axis, the light units 135 will be configured to provide light extending outwardly therefrom over a relatively broad angle, typically 100°-150°, although alternatives are possible. A typical example would be over an angle of 120°. On the other hand, when the LED unit is intended to provide spotting, such as a alley light or takedown light arrangement, the LED units are configured to provide for relatively narrow beam of light, for example within the range of 5°-20°. This allows for a fairly intense direction of light, at a selected subject.

Figure 19:
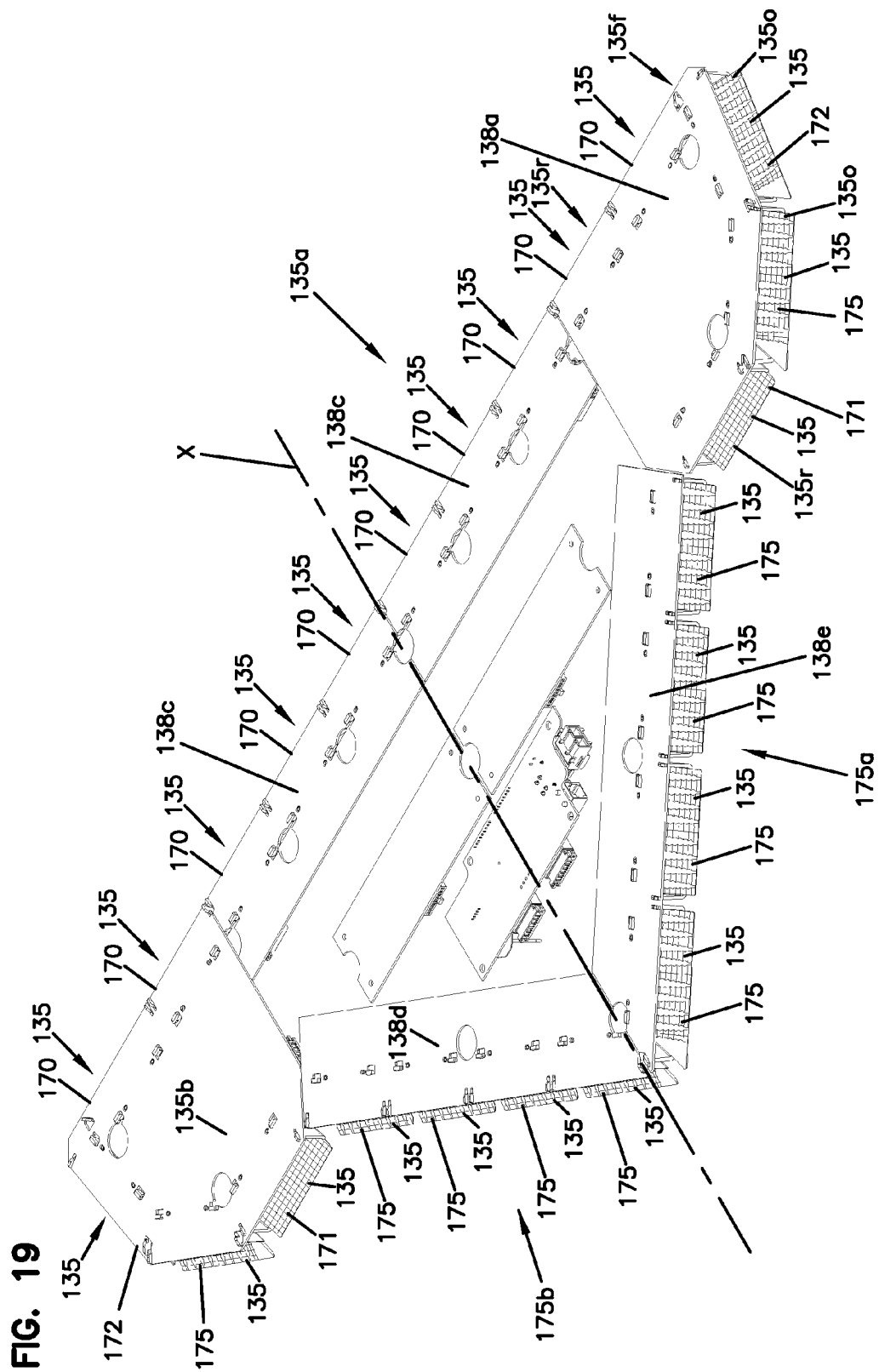
FIG. 19 is a schematic top plan view of an LED unit configuration usable in the assembly of FIGS. 7-14.

Attention is now directed to FIG. 19. In FIG. 19, an array 135a of light units 135 is depicted. The array 135a is shown as it would be for the example assembly 101 by individual ones of LED units 135 positioned on printed circuit sections or pieces. Referring to FIG. 19, for example, attention is directed to printed circuit board section 138a. This section 138a includes five (5) LED units thereon, comprising: two units 135r directed rearwardly, one unit 135f directed forwardly and two off axis directed units 135o. Printed circuit board section 138a, then, can be preassembled and the mounted with an assembly 101. Printed circuit section 138b can be analogously constructed as unit 138a, except as a mirror image.

Printed circuit board section 138c includes four (4) units 135, each generally directed in the same direction. An analogous, but mirror image positioned printed circuit board section 138d is also shown.

Attention is also directed to printed circuit board sections 138e each of which includes three (3) rearwardly facing ones of units 135. Sections 138c can generally be analogous to one another.

From a review of FIG. 19, then, it can be seen that the array 135a of LED units depicted in FIG. 18, can be provided by preformed printed circuit board sections (138a-138e) each having an appropriate number of LED units 135 also appropriately directed for use. Of course, alternate arrays and sub-assemblies can be used.

Typically, each one of the LED units 135 includes a plurality of LED chips therein, allowing for intense light and also, typically, alternative color selection, typically from among red, blue, amber, and white, although, again, alternatives are possible. These can then be used to generate a variety of light effects from the assembly 101, as described below.

Figure 21:
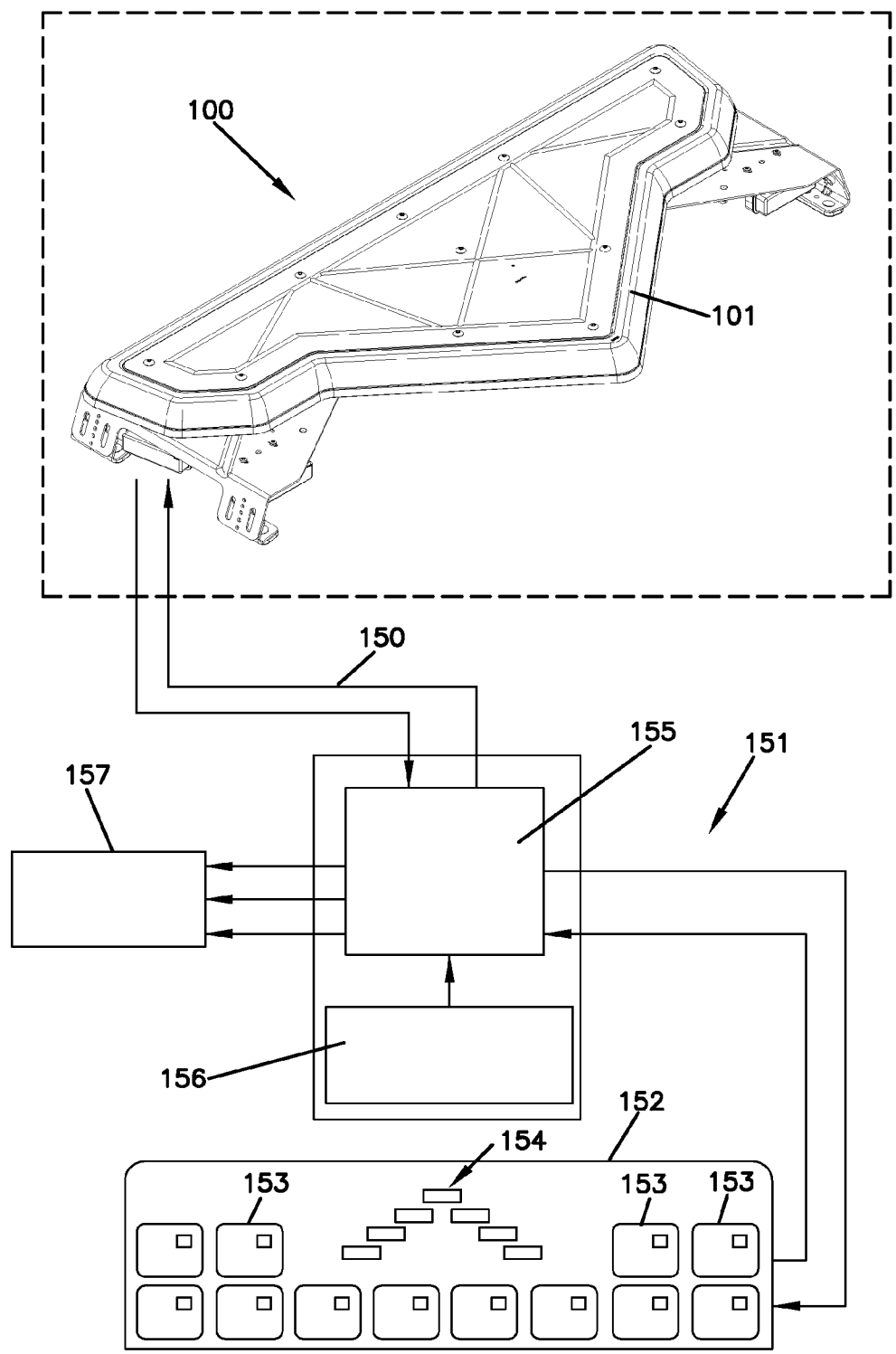
FIG. 21 is a schematic view of an assembly in accord with FIG. 7 depicted in association with a control assembly.

In FIG. 21, a schematic depiction is provided of a warning light arrangement 100 including assembly 101 electrically connected via circuit 150 to control arrangement 151. Control arrangement 151 is depicted schematically as including control panel 152 having various keys 153 thereon and as including a micro-processor arrangement 155, with the overall arrangement powered by power source 156. At 157, an auxiliary light arrangement as discussed below is provided. At 154, lights to mimic operation of the warning light 101, are depicted.

In general terms, a vehicle operator, by selecting individual ones of keys 153, can obtain desired light effects, i.e. desired operation of individual of LED units 135. The light effects can be preprogrammed, or can be selectively generated as desired by the operator.

To accomplish desirable light effects, individual LED units 135 are positioned to direct light through optic sections of the cover 130c in selected ones of different directions. For the particular arrangement depicted, these include at least the following.

1. A set (plurality) of light units 135 oriented to direct light through the cover 130a in a direction rearwardly of the vehicle, i.e. in a direction away from rear end 105 of light assembly 101 in a direction generally parallel to central axis X. In FIG. 19, these selected ones of units 135 are indicated generally at 170. Typically, the light assembly

101 includes at least four (4) units 170, oriented with light directed generally parallel to central axis X; usually it include at least six (6) and typically at least eight (8) such units. Also typically, there is the same number of units 170 on each side of the central axis X, although alternatives are possible. The particular assembly 101 depicted, FIG. 18, includes ten (10) units 170, five (5) on each side of central axis X. In general terms, lights 170 can be used to create, for example, a light arrow effect, comprising an amber arrow of blinking lights to the left or right of the vehicle, viewable from behind, if desired. Units 170 can also be used to create flashing blue and/or red light, if appropriate colors are chosen.

It is noted that that it was mentioned above that light units 170 are generally oriented to direct light parallel to axis X. In more general terms, they will typically be oriented to direct light rearwardly at an angle of 0°-20°, typically 0°-15°, inclusive and preferably 0°-10°, inclusive, of axis X. Most preferably they will direct rearwardly at an angle of 0° relative to axis X, i.e. parallel with axis X. Herein, again, when reference is meant to a direction of light or light projection, reference is meant to a general center of light projection from an LED unit, and not to suggest that there is no diffusion of light.

2. Typically, selected ones of the light units 135 are positioned oriented to direct light substantially forwardly of the vehicle, in a direction generally parallel to the central axis X and generally opposite the direction of the light direction from units 170. Referring to FIG. 19, light units 171 correspond to such units. Typically, the assembly 101 includes at least one such unit 171 and usually at least two. Also typically the light assembly 101 includes the same number of such units 171 on opposite sides of the central axis X. Referring to FIG. 19, the particular light assembly 101 depicted, includes two (2) units 171.

Light units 171, which direct light forwardly, can be used, for example, selectively as takedown lights, i.e. white lights directed forwardly of the vehicle, as selected by the vehicle operator. They can also (or alternatively) be used, in combination with other ones of units 135, to create moving light effects by flashing, for example red or blue.

Herein, when it said that lights from units 171 are projected forwardly, it is meant that the light is directed forwardly at an acute angle, relative to axis X, within the range of 0°-20°, inclusive. Typically, the light direction will be within the range of 0°-15°, inclusive, of axis X and typically within the range of 0°-10°, inclusive, of axis X. Indeed, typically LED units 171 will be oriented to direct light parallel to axis X. This reference to angles is to light direction. Associated optic sections of perimeter 103p are usually perpendicular to light direction, although alternatives are possible.

3. Typically, selected ones of the light units 135 are oriented to direct light beams laterally to the central axis X, i.e. substantially laterally to a direction of light from rearwardly facing units 170 and forwardly facing units 171. By "substantially laterally" in this context, it is not meant that the units necessarily direct the light precisely at an angle of 90° to the central axis X and/or the general direction of focus of light units 170, 171; but rather that the direction is often at an angle within the range of 70°-90°, inclusive, of axis X; typically an angle within the range of 75°-90°, inclusive, usually 80°-90°, inclusive. Also typically, when not perpendicular, the acute angle is forward, typically at least 1°, usually at least 2° and often at least 5°.

Referring to FIG. 19, such units are indicated generally at 172. The particular units 172 are oriented to direct light forwardly at an angle of about 10° relative to a line perpendicular to the central axis X, with the acute angle of direction being toward a direction forward of the vehicle.

There are typically at least two units 172, one directed light toward each side of the vehicle, i.e. one on each side of the central axis X. While there may be more than one on each side, typically one unit 172 for each side is enough.

Light units 172 can be used to project white light as alley lights or side lights, selectively, by the vehicle operator. Thus, they can be used to direct light to the side of the vehicle, and somewhat forwardly, for example the view down alleys, or to view building features, landscape features, persons, etc., to the side of the vehicle. Light units 172 can additionally, or alternatively be used as part of colored lights effects.

4. Typically, it is desirable that the assembly 101 as indicated above be configured to provide for a moving light sequence with fixed lights, that can be viewed from in front of the vehicle and also generally off central axis X, for example forwardly and laterally of the vehicle toward either side. Light units that are specifically configured and positioned to provide for this are depicted in FIG. 19 at 175. Light units 175 can be viewed as at least defining two sets 175a, 175b. Units 175a, are positioned on a first side of the central axis X and units 175b on a second, opposite, side of central axis X, i.e. opposite the first side. Each set 175a, 175b generally comprises a linear arrangement of multiple units 175. Each of the sets 175a, 175b preferably includes at least two (2) LED units, typically at least three (3) LED units; and, preferably four (4) or more LED units. With the particular assembly 101 depicted, FIG. 19, each of sets 175a, 175b includes, preferably, the same number of units.

Still referring to FIG. 19, each of the sets 175a, 175b includes a plurality of adjacent LED units, and each includes one unit spaced from the adjacent units, by forwardly directed light 171f. Specifically, each of sets 175a, 175b comprises four (4) adjacent units 175 and each has one (1) of units 175 spaced from the group of four (4) units, by one of the lights 175. In more general terms, each of the sets 175a, 175b typically includes at least two (2) units, usually includes at least three (3) units and often includes four (4) units or more. Also, typically each of the sets 175a, 175b includes at least three (3) adjacent units, and at least one other unit spaced from the at least three (3) adjacent units by a forwardly directed unit, in the example depicted one of light units 171.

Although alternatives are possible, each of the lights 175, in each of the sets 175a, 175b, in the example depicted, is oriented to direct light in the same direction relative to central axis X, at generally at angle within the range of 20°-70°, typically 30°-60°, inclusive; and, in the example depicted, at about 35°-55°, inclusive. There is no specific requirement that all of lights 175 in any given set 175a, 175b be directed in the same direction, but this will be typical.

Lights units 175 can be used to generate a plurality of color patterns, for example flashing red lights, flashing blue lights, both of flashing of red and blue lights, etc., depending on LED specifics. They can also be used to generate, through various sequencing, a variety of constantly viewable but flashing light effects.

Light units 171 can be selected to be coordinated with light units 175 in providing a desirable flashing pattern.

Referring to FIG. 19, as previously noted, the lights 135 are secured to printed circuit boards, for convenient assembly. Board 138a includes two rearwardly facing units 170, one side unit 172, one forward unit 171, and one forward off axis unit 175. Printed circuit board 138a is configured to be positioned on a left end of the housing 103 (facing forwardly)

adjacent a rear edge thereof. Printed circuit board 130b is generally analogous, but a mirror image of circuit board 138a.

Boards 138c each include three units 170, oriented rearwardly facing. Each of boards 138c, 138e includes four (4) LED units, each forwardly directed, off axis. Boards 138d and 138e are configured and positioned as mirror images of one another, on opposite sides of axis CC.

The printed circuit boards 138a-138e facilitate assembly.

Figure 20:
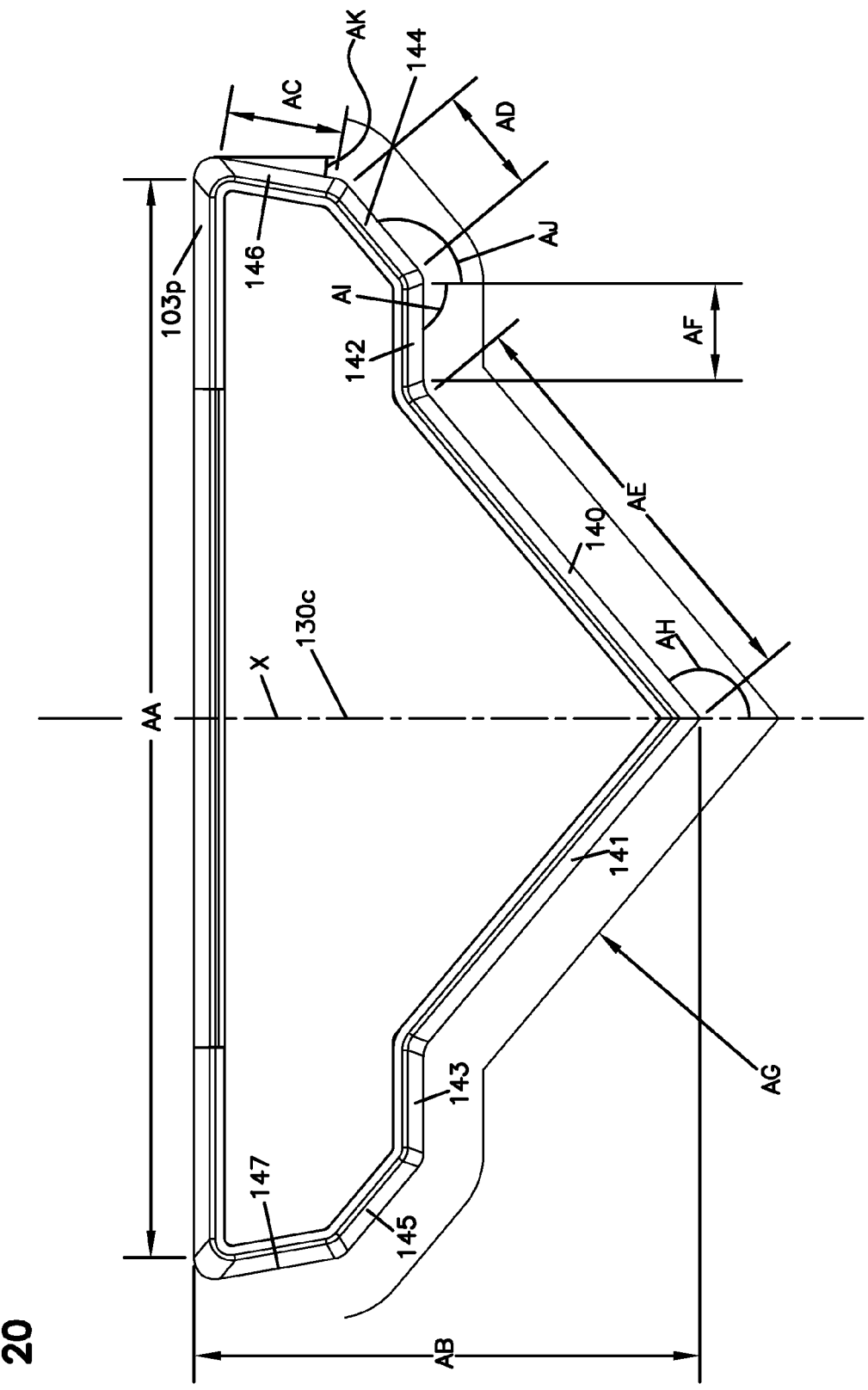
FIG. 20 is schematic top plan view of a housing portion of the assembly of FIG. 7, with example dimensions indicated.

In FIG. 20, a schematic view of cover 130c is provided. Example dimensions and angles are as follows: AA=43 inches; AB=20.1 inches; AC=4.7 inches; AD=4.4 inches; AE=16.8 inches; AF=3.9 inches; and, AG=53 inches. Angle AH, which is an acute angle of direction for light in section 140, 141, relative to a vehicle direction central alignment axis X, is typically 130°. Angle AI which is angle relative to central axis X of sections 142, 143, is generally 90°. Angle AJ, which is an angle of sections 144, 145, relative to axis X, is typically 130°; Angle AK, which is generally a direction of sections 146, 147, relative to central axis X is 10°.

III. Auxiliary Lights and Equipment; the LED Units

A. Auxiliary Lights

The assembly 100 can be configured with optional auxiliary lights. Referring to FIG. 7, some example optional auxiliary lights are indicated at 180, and comprise individual lights 180a, 180b. Lights 180a, 180b are forwardly directed, and can comprise white light units selected for a strong and intense takedown light effect. For example light arrangement 180 can be switched on by a vehicle operator, when the vehicle is stopped to direct light intensely forwardly of the vehicle. This can create, for example, a light blinding effect to a stopped motorist, in front of the vehicle, as the patrol officer leaves his vehicle and approaches the stopped vehicle.

Still referring to FIG. 7, a second, optional, auxiliary light arrangement is indicated generally at 185 comprising unit 185a and an opposite unit that would be located generally oppositely, i.e. where indicated by arrow 185b. These lights 185a, 185b can be used as alley lights (i.e. as side directed lights) as well, selectively operable by the vehicle operator. Typically, then they would be selected to be white lights, although alternatives are possible.

From the above, it will be understood that the vehicle can be provided with more than one takedown light arrangement and more than one side light arrangement. In the alternative, when lights 180 and 185 are present, light units 172, 171, FIG. 19 can be included in color (flashing) patterns at the same time.

Typically, when the assembly includes auxiliary lights such as parts of light arrangement 180 or 185, those lights are configured to direct white light over a relatively narrow beam, typically 5°-20°, inclusive. When such is the case, forward lights and side lights in the housing 103, can be selected to extend light over a somewhat broader angle, consistently with other lights therein, with the angle typically being 100°-150°, inclusive, for example 110°-140°, inclusive. Of course, alternatives are possible.

B. Additional Auxiliary Equipment.

Additional auxiliary equipment can be included in the light assembly 100. For example camera arrangement, radar equipment and/or sound equipment can be mounted thereon.

C. The LED Units

Typically, the LED units would be assembled to include high power LED chips therein, for example each being 18-100 lumen. As even more powerful LED's are developed, there may be used. Multiple color chips, or multiple ones of different color chips, will typically be included within each LED unit. Thus, each LED unit can comprise a number of individual LED chips for different light effects.

Typically a rearwardly facing LED units will be configured to at least provide amber light; and, in some instances rearwardly facing LED units can alternatively provide at least one of red and blue light. In some instances each can be configured to provide, alternatively, each of amber, red and blue light. These can be used for a variety of desirable effects.

Typically, LED units 175 in the forward off axis sections, will be configured to at least provide a selected one of red and blue light, and often, alternatively each of red and blue light. They maybe configured for white and/or amber, as well. However, many vehicle users prefer amber light to only be visible from the rear.

Each of the forward facing lights 171 and each of the sidewardly directed 172, when intended to be part of a flashing display, will typically be configured to provide, alternatively, at least one of a red and blue light and in some instances each of red and blue light alternatively. White light, however, can also be used.

In many instances, the sidewardly directed lights 172 and forwardly directed lights 171 will include LED chips to facilitate selection for white light direction, to be used as takedown and side lights, as discussed previously. It is noted that chips allowing for white light distribution may be included in any of the various LED units, as desired.

It can be seen then that the LED units can be configured for a wide variety of possible light effects, operated either to a selected preprogrammed mode or as may be individually selected, depending on the particular desires of the equipment purchaser.

IV. Some General Principles and Observations

In accord with the present disclosure, warning light arrangements for use on a motor vehicle are described. The light arrangements are generally configured to be positioned on a roof of the motor vehicle in use, for example as a light bar warning light arrangement for a police or other vehicle.

The warning light arrangement typically includes a housing sized and configured to be operably positionable on the vehicle roof, typically to be secured thereto with a bracket or mounting bracket arrangement.

In general terms, the housing includes an outer perimeter and defines a housing interior. The housing perimeter is shaped to define a forwardly directed front portion and an opposite rearwardly directed rear portion. In this context, the terms "front", "rear", and "forwardly directed", "rearwardly directed", and variants thereof, are meant to reference the normal vehicle front and rear directions, when mounted for use.

In general, the housing defines a vehicle direction central alignment axis. The vehicle direction central alignment axis of the housing is generally an axis oriented to align with a central front/rear movement axis of the vehicle, in use. Typically, the housing will be mounted a vehicle such that the housing vehicle direction central alignment axis is co-linear with a central forward/rear axis of the vehicle, or substantially co-linear therewith.

The warning light arrangement includes a first plurality of LED units positioned within the housing and oriented so that each selected one of the plurality of LED units can be actuated to emit light in a selected direction (for that selected one of the LED units) outwardly from the housing. By this it is meant that each LED is positioned in the housing to direct, outwardly from the housing, light in a single selected direction. Thus the LED units are not themselves moveable and are not associated with movable or rotatable reflectors, to change the direction that the light therefrom is directed during use. However, there is no specific intention by the previous discussion in this paragraph, to suggest that every LED unit is oriented to direct light in the same direction. Further, herein when reference is made to a direction of light or light projection, it is not meant that the light is not allowed to diffuse over an angle with respect to the direction. Rather the defined direction is meant to be a central direction for the light emission around a central vertical axis to the housing, i.e. generally in a direction relative to the vehicle direction central alignment axis.

Thus, herein when it said that the warning light arrangement is configured such that light direction is not varied in a direction outwardly from the housing (for any of the first plurality of LED units in use) it is meant that none of the LED units in the first plurality is associated with a movable or rotatable reflector, which can selectively change the light direction during use.

In a typical arrangement as described, the first plurality of LED units includes a forward light arrangement comprising at least one LED unit directed forward at an angle within the range of 0°-20°, inclusive, (typically 0°-15°, inclusive and usually 0°-10°, inclusive) with respect to the vehicle direction central alignment axis. Typically, the forward light arrangement includes at least two (2) spaced LED units so directed, one (1) positioned on each side of the central alignment axis. Again, in this context, reference to the direction of light from a given or defined LED, is meant to generally be a central direction and not to define whether there is any angle to the overall light emission from that LED unit.

In a typical assembly depicted, the first plurality of LED units includes a first set of forward, side, warning LED units (i.e. off axis units) each configured to direct light forwardly at an angle within the range of 20°-70°, inclusive, (typically 30°-60° inclusive, usually 35°-55°, inclusive, for example 45°) of the vehicle direction central alignment axis X and outwardly from a first side of the housing relative to the vehicle direction central alignment axis. The first set of forward, side, warning LED units, then, generally comprises individual units each of which is directed forwardly of the warning light arrangement and vehicle, and off axis relative to the vehicle direction central alignment axis X. This creates a line or array of LED units visible form in front of the vehicle and at an arc toward the first side that can be viewed from in front of the vehicle and off to that side. For example, this set of lights would be viewable from a side road, by a person in a vehicle and approaching an intersection that is also being approached by the safety vehicle having a warning light arrangement thereon (when the approach is from the same side as the first set of LED units). The lights in the first set of LED units can be configured as discussed below, to emit a plurality of light signals of various colors, to increase visibility to and alarm persons or vehicles in front and off axis relative to the safety vehicle. There is no requirement that each LED unit in the first set of LED units be directed at the same angle relative to the central alignment axis, but it will be typical that they are.

In a typical arrangement described herein, the first plurality of LED units also includes a second set of forward, side, warning LED units each configured to direct light forwardly at an angle within the range of 20°-70°, inclusive, (typically 30°-60°, inclusive, usually 35°-55°, inclusive, for example 45°) of the vehicle direction central alignment axis and outwardly from a second side of the housing, relative to the vehicle direction central alignment axis. Thus, the second set of warning LED units can comprise an array of LED units oriented to be directed toward a view, off axis, of the vehicle direction toward a side opposite the first side. Again, this plurality of LED units can be configured to operate with various sequencing patterns, and to display a variety of colors, to warn persons in vehicles ahead of the emergency vehicle and off axis therefrom. There is no requirement that each LED unit in the second set of LED units be directed at the same angle relative to the central alignment adjacent axis X, but it will be typical that they are.

In a typical assembly described herein, the first plurality of LED units also includes a set of rear warning LED units each configured to direct light rearwardly from the housing, preferably at an angle of 0°-20°, inclusive, (typically 0°-15°, inclusive and usually 0°-10°, inclusive) with respect to the vehicle direction central alignment axis X. The set of "rear warning LED units," then, comprises LED units directed to be visible from behind the safety vehicle, in use. These lights can be configured to provide a variety of lighting effects, including arrow effects and/or flashing color effects, for example. There is no specific requirement that each LED unit the set of rear warning LED units be positioned to project light at the some angle relative to the central alignment axis X, but it will be typical that they are.

There is no specific requirement that an assembly include all of the features characterized herein, in order to obtain some benefit in accord with the present disclosure. However, the various types of LED units characterized previously, will typically be implemented in the same warning light assembly, to advantage.

A warning light arrangement in accord with the present disclosure can be configured such that the first plurality of LED units includes a side illumination arrangement comprising at least one LED unit directed from the first side of the housing at angle within the range 70°-90°, (typically 75°-89°, inclusive, usually 79°-89°, inclusive) of the vehicle direction central alignment axis X. Typically, this side illuminator is directed slightly forwardly.

Typically, when the assembly includes LED units arrangements for side illumination in the first plurality of LED units, the first plurality of LED units also includes a second side illumination arrangement comprising at least one LED unit directed from the second side of the housing at angle within the range of 70°-90° inclusive (typically 75°-89°, usually 79°-89°, inclusive) of the vehicle direction central alignment axis X, typically oriented to direct light forwardly.

Typically the housing is configured to have a total maximum housing vertical dimension of no more than 4 inches (10.2 cm) and typically no more than 3 inches (7.6 cm). The term "total maximum housing vertical dimension" is meant to indicate the highest vertical dimension through the housing between an uppermost portion of the housing and a lowermost portion of the housing. The dimension is not meant to indicate any added dimension to the height of the housing when resting upon the vehicle that can be attributed to a bracket arrangement or similar instruction for mounting. Typically the housing defines a total maximum housing vertical dimension of no more than 3 inches (7.6 cm) and often no more than 2.5 inches (6.4 cm).

Typically, the housing is configured so that an upper surface thereof, for example when viewed from in front of the vehicle, that presents a fairly even upper surface edge profile, having no relief therein of greater than 1 inch (2.5 cm), typically no greater than 0.5 inch (1.3 cm) and usually no greater than 0.25 inch (0.64 cm). A similar characterization would apply when the housing edge when viewed from either side or the rear. A reason for this relatively even upper surface definition to the lighting arrangement, is to make it more difficult to distinguish that a vehicle is a patrol car, for example when observed without the lighting arrangement turned on. Thus, the relatively even upper profile to the light arrangement and its relatively low profile, in combination, provides for the appearance of a luggage rack or similar construction, for example in low light or from a distance, and when the warning light arrangement is not switched on.

In a typical assembly, the first plurality of LED units comprises a first LED unit positioned on a first side of the vehicle direction central alignment axis and a second LED unit positioned on a second side of the vertical direction central alignment axis, each of which is directed forwardly at an angle within the range of 0°-20°, inclusive, of the vehicle direction alignment axis, typically at an angle within the range of 0-15°, inclusive, (and usually 0°-10°) of a vehicle direction alignment axis. Alternately stated, the typically the light arrangement comprises a forward light arrangement including at least one LED unit directed forwardly, and positioned in the housing on each side of the vehicle direction central alignment axis.

Typically, each LED unit in the forwardly directed light arrangement is directed at substantially the same angle forwardly (relative to the vehicle direction central alignment axis X) although unless specified there is no requirement that they do so.

In a typical arrangement according to the present disclosure, the set of rear warning LED units comprises at least six (6) LED units oriented with: a first three (3) of the at least six (6) units positioned on a first side of the vehicle direction central alignment axis; and, a second three (3) of the at least six (6) units positioned on a second side of the vehicle direction central alignment axis X. Typically this set of rear warning LED units comprises at least eight (8) LED units oriented with at least four (4) units on each side of the vehicle direction central alignment axis. Thus, in general terms, the set of rear warning LED units typically comprises a plurality of rearwardly facing LED units visible from a rear of the vehicle. An array or line LED units can be used to create various light effects viewable from a rear of the vehicle, including for example arrow effects that appear to be flashing arrows toward one or the other of selected sides of the vehicle.

In a typical arrangement, the first set of forward, side, warning LED units comprises at least three (3) LED units, typically at least four (4) LED units, as does the second set of forward, side, warning LED units.

In an example described, a first set of forward, side, warning LED units comprises at least four (4) LED units configured with: at least three (3) LED units being adjacent one another in a line, and at kcas one of the LED unit laterally spaced from the at least three adjacent units by at least one (1) LED unit in the forwardly directed light arrangement. Further, in a typical arrangement described, the second set of forward, side, warning LED units is similarly configured with a set of at least three (3) adjacent units in a line, and at least one (1) other unit spaced from the at least three (3) units by at least one (1) LED unit in the forwardly directed light arrangement.

Typically, each LED unit includes a plurality of LED chips.

Herein, example assemblies are described and shown in which the housing perimeter defines a rear, straight, optic edge extending over a distance of at least 36 inches (91 cm), typically at least 38 inches (97 cm), and often within the range of 40-46 inches (102-117 cm), inclusive. Also, typically, the housing defines a front, V, section having two straight optic edge sections each extending over a distance of at least 12 inches (30 cm), typically at least 14 inches (36 cm) and often within the range of 15-18 inches (38-46 cm), and each extending at an angle of relative to the other, within the range of 170°-210°, typically within the range of 180°-205°, relative to the other.

A typical example arrangement is depicted in which the housing perimeter defines a first, straight, side optic edge on a first side of the vehicle direction central alignment axis extending over a distance of at least 2.5 inches (6.4 cm), typically at least 3.5 inches (8.9 cm) and often within the range 3.5-6 inches (8.9-15 cm), and also directed at least slightly forwardly of the rearward edge. Typically, the housing perimeter defines a second, straight, side optic edge, of similar dimension.

Herein, a warning light arrangement is described in which the housing perimeter includes a first, straight, road side optic edge extending over a distance of at least 3 inches (7.6 cm), typically at least 3.5 inches (8.9 cm) and often within the range of 4-6 inches (10-15 cm) and oriented adjacent the rear straight edge and directed forwardly at a forward acute angle of at least 1°, typically at least 2° and often within the range of 5°-20°, inclusive. Further, the housing perimeter typically includes a second roadside optic edge similarly defined, but positioned on an opposite side of the vehicle direction central alignment axis from the first straight roadside optic edge, and directed away from the vehicle toward an opposite side.

Herein, a warning light arrangement is generally characterized in which the housing is positioned on a vehicle mounting bracket, on a vehicle, so that a total maximum vertical extension of the mounting light arrangement, above an underneath portion of a vehicle roof in use, is no greater than 8 inches (20 cm) and typically no greater than 7 inches (18 cm) and sometimes no greater than 6 inches (15 cm).

In arrangements in accord with the present disclosure, a variety of light configurations can be provided, to accomplish certain selected desired light effects or options. Typically, each LED unit in the side light arrangement will be configured to selectively project at least white light, i.e. light of broad color band. Also, typically each LED unit in each of the first and second sets of forward, side, warning LED units will be configured to selectively project at least one of blue and red light; typically, alternatively, each of blue and red light. By this, it is meant that typically each LED unit in the first and second sets of forward, side, warning LED units is configured so that the operator can choose to have them emit red light or blue light, and in some instances each of red and blue light (although not typically simultaneously from any given LED unit).

Also typically each LED unit in the set of rear warning LED units is configured to selectively project at least amber light; and, typically alternatively, at least one of red and blue light. By latter this it is meant that each LED unit in the set of rear warning LED units can be selectively operated to project amber light and each can also be selectively operated to, as an alternative to projecting amber light, project at least one of red and blue light, and in some instances each of red and blue light.

It is noted that the LED units can be configured such that selected ones can include a plurality of different color light generators therein, as desired.

The warning light arrangement in accord with the present disclosure, can be configured to include thereon auxiliary side light and/or auxiliary front lights.

In accord with an alternate characterization of the principles according to the present disclosure, an overall warning light or warning light arrangement for attachment to a motor vehicle is provided which includes a housing having a top surface, a bottom surface, a lead face and trailing face. A plurality of LED units is visibly oriented within the housing such that light from the plurality of LED units emits from the leading face and trailing face of the housing. By this it is meant that the LED units are positioned so as not to move, and do not include reflectors that move. Further, it is not meant that each LED unit emits from both leading face and trailing face, but rather that each one is oriented to project from one of the leading and trailing face.

In still another alternate characterization of a warning light or warning light assembly according to the present disclosure, a housing is provided which includes a top surface, a bottom surface, a leading face and a trailing face and a plurality of LED light units is oriented within the housing such that light from the LED units emits from the leading face to the trailing face oriented the leading a v-shaped center portion and an adjacent end portion and a the average distance between the top surface and the bottom surface is less than 3 inches. Typically such an arrangement includes a lens or lens arrangement (i.e. lenses) that extend across the majority portions of the leading face and trailing face in the housing.

In accord with the present disclosure, methods are provided, for configuring emergency light arrangements on a vehicle and using those arrangements. The methods generally involve providing structure as characterized herein above. The methods also include providing for light operation to accomplish the types of effects characterized herein.

Thus, in general terms, a method of providing a warning light arrangement is provided. The method comprises a step of positioning a plurality of LED units in a housing of appropriate size to be positioned on a vehicle roof. The step of positioning comprises providing a first plurality of LED units positioned within the housing and oriented so that each selected one of the plurality of LED units can be actuated to emit light in a selected direction, for the selected one of the LED units, outwardly from the housing. The positioning includes a first plurality of LED units, providing: a first set of forward, side, warning LED units; and, a second set of forward, side, warning LED units, directed toward an opposite side from the first set of forward, side, warning LED units. Typically and preferably at least one forward LED and at least one rearward LED with unit are also provided.

Also in accord with the present disclosure, a method of operating a warning light arrangement is provided. The method generally includes a step of actuating a first plurality of LED units positioned in the housing of appropriate size on a vehicle roof. In more specific terms, individual LED units of the type previously characterized herein, are actuated.

Again, there is no specific requirement that the unit, component, or method involve all of the specific detail characterized herein, in order to obtain some benefit according to the present disclosure.

What is claimed:

1. A warning light arrangement for use on a motor vehicle; the light arrangement comprising:
   (a) a housing having an outer perimeter and defining a housing interior;
      (i) the housing being sized and configured to be operably positionable on a vehicle roof;
      (ii) the housing perimeter defining a forwardly directed, front, portion; and, an opposite, rearwardly directed, rear portion; and,
      (iii) the housing defining a vehicle direction central alignment axis;
   (b) a first plurality of LED units positioned within the housing and oriented so that each selected one of plurality of LED units can be actuated to emit light in a selected direction, for the selected one of the LED units, outwardly from the housing;
      (i) the warning light arrangement being configured such that light direction is not varied in direction outwardly from the housing, for any of the first plurality of LED units, in use;
      (ii) the first plurality of LED units including a forward light arrangement comprising at least one LED unit directed in a forward direction within an angle within the range of 0°-20°, inclusive, with respect to the vehicle direction central alignment axis;
      (iii) the first plurality of LED units including a first set of forward, side, warning LED units each configured to direct light at an angle within the range of 20°-70° inclusive, of the vehicle direction central alignment axis and outwardly from a first side of the housing, relative to the vehicle direction central alignment axis;
      (iv) the first plurality of LED units including a second set of forward, side, warning LED units each configured to direct light at an angle within a range of 20°-70°, inclusive, of the vehicle direction central alignment axis and outwardly from a second side of the housing, relative to the vehicle direction central alignment axis; and,
      (v) the first plurality of LED units including a set of rear warning LED units each configured to direct light rearwardly from the housing at an angle of within the range of 0°-20°, inclusive, with respect to the vehicle direction central alignment axis.

2. A warning light arrangement according to claim 1 wherein:
   (a) the first plurality of LED units includes a first side light arrangement comprising at least one LED unit directed from the first side of the housing at an angle within a range of 70°-90°, inclusive, of the vehicle direction central alignment axis; and,
   (b) the first plurality of LED units includes at least a second side light arrangement comprising at least one LED unit directed from the second side of the housing at an angle with a range of 70°-90°, inclusive, of the vehicle direction central alignment axis.

3. A warning light arrangement according to claim 2 wherein:
   (a) the first side light arrangement comprises at least one LED unit directed from the first side of the housing forwardly at an angle within the range of 75°-89°, inclusive, of the vehicle direction central alignment axis; and,
   (b) The second side light arrangement comprises at least one LED unit directed from the second side of the housing forwardly at an angle within the range of 75°-89°, inclusive, of the vehicle direction central arrangement.

4. A warning light arrangement according to claim 1 wherein:
   (a) the housing defines a total maximum housing vertical dimension of no more than 3 inches.

5. A warning light arrangement according to claim 1 wherein:
   (a) the housing defines an upper surface having a maximum relief therein of no greater than 1 inch.

6. A warning light arrangement according to claim 1 wherein:
   (a) the forward light arrangement comprises at least a first LED unit positioned on a first side of the vehicle direction central alignment axis and a second LED unit positioned on a second side of the vehicle direction central alignment axis;
      (i) each one of the first and second LED units in the forward light arrangement being directed in a forward direction within an angle of 0°-15°, inclusive, of the vehicle direction central alignment axis.

7. A warning light arrangement according to claim 1 wherein:
(a) the set of rear warning LED units comprises at least six (6) LED units oriented with:
(i) a first three (3) of the at least six (6) LED units positioned on a first side of the vehicle direction central alignment axis; and,
(ii) a second three (3) of the at least six (6) LED units positioned and a second side of the vehicle direction central alignment axis.

8. A warning light arrangement according to claim 1 wherein:
(a) each LED unit in the set of rear warning LED units is configured to direct light rearwardly at an angle of 0°-10°, inclusive, relative to the vehicle direction central alignment axis.

9. A warning light arrangement according to claim 1 wherein:
(a) the first set of forward, side, warning LED units comprises LED units each of which is configured to direct light forwardly at an angle from within the range of 30°-60°, inclusive, relative to the vehicle direction central alignment axis; and,
(b) the second set of forward, side, warning LED units comprises LED units each of which is configured to direct light forwardly at an angle from within the range of 30°-60°, inclusive, relative to the vehicle central direction alignment axis.

10. A warning light arrangement according to claim 1 wherein:
(a) the first set of forward, side, warning LED units comprises at least three (3) LED units; and,
(b) the second set of forward, side, warning LED units comprises at least three (3) LED units.

11. A warning light arrangement according to claim 1 wherein:
(a) the first set of forward, side, warning LED units comprises at least four (4) LED units configured with:
(i) at least three (3) adjacent units; and,
(ii) at least one (1) unit laterally spaced from the at least three (3) adjacent units by at least one (1) LED unit in the forward light arrangement; and,
(b) the second set of forward, side, warning LED units comprises at least four (4) LED units configured with:
(i) at least three (3) adjacent units; and,
(ii) at least one (1) unit spaced from the at least three (3) adjacent units by at least one (1) LED unit in the forward light arrangement.

12. A warning light arrangement according to claim 1 wherein:
(a) the housing perimeter defines;
(i) a rear, straight, optic edge section extending over a distance of at least 36 inches; and,
(ii) a front, V, section having two straight optic edge sections each extending over a distance of at least 12 inches and at an angle with the range of 170°-210°, inclusive, relative to the other.

13. A warning light arrangement according to claim 12 wherein:
(a) the housing perimeter defines;
(i) a straight, first, side forward optic edge section on a first side of the vehicle direction axis extending over a distance of at least 2.5 inches and directed opposite the rearward edge; and,
(ii) a straight, second, side forward optic edge section on a second of the vehicle direction central alignment axis extending over a distance of at least 2.5 inches and directed opposite the rearward edge section.

14. A warning light arrangement according to claim 13 wherein:
(a) the housing perimeter includes:
(i) a straight, first, side optic edge section extending over a distance of at least 3 inches and oriented adjacent the rear straight edge section and directed, forwardly, at a forward acute angle of at least 1°; and,
(ii) a second side optic edge section extending over a distance of at least 3 inches and oriented adjacent the rear straight edge and directed, forwardly, at a forward acute angle, of at least 1°.

15. A warning light arrangement according to claim 1 wherein:
(a) each LED unit in the forward light arrangement is configured to selectively project at least white light;
(b) each LED unit in each of the first and second sets of forward, side, warning LED units is configured to selectively project at least one of blue and red light; and,
(c) each LED unit in the set of rear warning LED units is configured to selectively project at least amber light.

16. A warning light arrangement according to claim 15 wherein:
(a) each LED unit in each one of the first and second sets of forward, side, warning LED units is configured to at least selectively, alternatively, project at each of red and blue light.

17. A warning light arrangement according to claim 1 wherein:
(a) each LED unit in the set of rear warning LED units is configured to selectively, alternatively, project at least amber light and at least one of red light and blue light.

18. A warning light arrangement according to claim 1 wherein:
(a) each LED unit in the set of rear warning LED units is configured to at least selectively, alternately, project each of amber light, red light, and blue light.

19. A warning light arrangement according to claim 1 including:
(a) an auxiliary forward light arrangement positioned underneath the housing.

20. A warning light arrangement according to claim 1 including:
(a) an auxiliary, side light arrangement positioned underneath the housing.

21. A warning light for attachment to a motor vehicle, the warning light comprising:
(a) a housing including a top surface, a bottom surface, a leading face, and a trailing face;
(b) a plurality of LED units fixedly oriented within the housing such that light from the plurality of LED units emits from the leading face and trailing face of the housing;
(i) the trailing face being configured to be positioned across the width of the motor vehicle and oriented in the rearward direction;
(ii) the leading face including a V-shaped center portion and two opposed end portions;
(iii) the V-shaped portion of the leading face being configured to emit light at an angle between 30 to 60 degrees, inclusive, relative to the forward direction; and (iv) each of the end portions of the leading face including a takedown portion that is configured to emit light at an angle between 0 to 10 degrees, inclusive, relative to the forward direction.

22. A warning light comprising:
   (a) a housing including a top surface, a bottom surface, a leading face, and a trailing face; the housing defining a vehicle direction central alignment axis; and,
   (b) a plurality of LED light units oriented within the housing such that light from the LED emits from the leading face and trailing face of the housing;
      (i) the leading face including a V-shaped center portion and an adjacent end portion; and,
      (ii) the average distance between the top surface and the bottom surface being less than 3.0 inches; and
      (iii) the trailing face including a set of rear warning LED units each configured to direct light at an angle of 0°-20°, inclusive, with respect to the vehicle direction central alignment axis.

23. A method of positioning warning lights on a motor vehicle, the method comprising:
   (a) orienting a plurality of LED units within a housing such that light from the LED units emits through lenses that extend across portions of a leading face and a trailing face of the housing, wherein the lenses direct the light from each LED unit in a selected, fixed, direction relative to the housing; the housing defining a vehicle direction central alignment axis;
      (i) the trailing face including a set of rear warning LED units each configured to direct light at an angle of 0°-20°, inclusive, with respect to the vehicle direction central alignment axis.

24. A method of providing a warning light arrangement; the method comprising a step of:
   (a) positioning a plurality of LED units in a housing of appropriate size to be positioned on a vehicle roof; the housing defining a vehicle direction central alignment axis; the step of positioning comprising providing:
      (i) a first plurality of LED units positioned within the housing and oriented so that each selected one of plurality of LED units can be actuated to emit light in a selected direction, for the selected one of the LED units, outwardly form the housing;
         (A) the warning light arrangement being configured such that light direction is not varied in direction outwardly from the housing, for any of the first plurality of LED units, in use;
         (B) the first plurality of LED units including a first set of forward, side, warning LED units each configured to direct light at an angle within the range of 20°-70° inclusive, of the vehicle direction central alignment axis and outwardly from a first side of the housing, relative to the vehicle direction central alignment axis; and,
         (C) the first plurality of LED units including a second set of forward, side, warning LED units each configured to direct light at an angle within a range of 20°-70°, inclusive, of the vehicle direction central alignment axis and outwardly from a second side of the housing, relative to the vehicle direction central alignment axis; and
         (D) the first plurality of LED units including a forward light arrangement comprising at least one LED unit directed in a forward direction within an angle within the range of 0°-20°, inclusive, with respect to the vehicle direction central alignment axis.

25. A method of operating a warning light arrangement; the method including a step of:
   (a) actuating a first plurality of LED units positioned in a housing of appropriate size on a vehicle roof; the housing defining a vehicle direction central alignment axis;
      (i) the warning light arrangement being configured such that light direction is not varied in direction outwardly from the housing, for any of the first plurality of LED units, in use;
      (ii) the first plurality of LED units including a first set of forward, side, warning LED units each configured to direct light at an angle within the range of 20°-70° inclusive, of the vehicle direction central alignment axis and outwardly from a first side of the housing, relative to the vehicle direction central alignment axis; and,
      (iii) the first plurality of LED units including a second set of forward, side, warning LED units each configured to direct light at an angle within a range of 20°-70°, inclusive, of the vehicle direction central alignment axis and outwardly from a second side of the housing, relative to the vehicle direction central alignment axis; and
      (iv) the first plurality of LED units including a set of rear warning LED units each configured to direct light rearwardly from the housing at an angle of within the range of 0°-20°, inclusive, with respect to the vehicle direction central alignment axis.

* * * * *